(12) United States Patent
Vartakavi et al.

(10) Patent No.: US 11,681,747 B2
(45) Date of Patent: Jun. 20, 2023

(54) METHODS AND APPARATUS TO GENERATE RECOMMENDATIONS BASED ON ATTRIBUTE VECTORS

(71) Applicant: Gracenote, Inc., Emeryville, CA (US)

(72) Inventors: Aneesh Vartakavi, Emeryville, CA (US); Carmen Yaiza Rancel Gil, Barcelona (ES); Anjana Gopakumar, Oakland, CA (US); Jason Timothy Cramer, Brooklyn, NY (US)

(73) Assignee: Gracenote, Inc., Emeryville, CA (US)

( * ) Notice: Subject to any disclaimer, the term of this patent is extended or adjusted under 35 U.S.C. 154(b) by 365 days.

(21) Appl. No.: 16/695,169

(22) Filed: Nov. 25, 2019

(65) Prior Publication Data
US 2021/0157835 A1    May 27, 2021

(51) Int. Cl.
  *G06F 16/68* (2019.01)
  *G06F 16/635* (2019.01)
  *G06F 16/638* (2019.01)
  *G06Q 30/0601* (2023.01)
  *G06F 16/22* (2019.01)

(52) U.S. Cl.
  CPC ........ *G06F 16/635* (2019.01); *G06F 16/2237* (2019.01); *G06F 16/639* (2019.01); *G06F 16/686* (2019.01); *G06Q 30/0631* (2013.01)

(58) Field of Classification Search
  CPC .... G06F 16/635; G06F 16/639; G06F 16/686; G06F 16/2237; G06Q 30/0631
  See application file for complete search history.

(56) References Cited

U.S. PATENT DOCUMENTS

| | | |
|---|---|---|
| 8,260,778 B2 | 9/2012 | Ghatak |
| 8,855,798 B2 | 10/2014 | DiMaria et al. |
| 9,317,185 B2 | 4/2016 | Martin et al. |

(Continued)

FOREIGN PATENT DOCUMENTS

| | | | |
|---|---|---|---|
| KR | 20090033750 A | 4/2009 | |
| KR | 20130054535 A | 5/2013 | |

(Continued)

OTHER PUBLICATIONS

Barthet et al, "Moodplay: An Interactive Mood-Based Musical Experience," 1-8, The Audio Mostly Conference, Oct. 25, retrieved May 19, 2017, 9 pages.

(Continued)

*Primary Examiner* — Robert W Beausoliel, Jr.
*Assistant Examiner* — Nirav K Khakhar
(74) *Attorney, Agent, or Firm* — McDonnell Boehnen Hulbert & Berghoff LLP

(57) ABSTRACT

Methods and apparatus are disclosed to generate a recommendation, including an attribute vector aggregator to form a resultant attribute vector based on an input set of attribute vectors, the set of attribute vectors containing at least one of a media attribute vector, an attendee attribute vector, an artist attribute vector, an event attribute vector, or a venue attribute vector, and a recommendation generator, the recommendation generator including: a vector comparator to perform a comparison between an input attribute vector and other attribute vectors and a recommendation compiler to create one or more recommendations of at least one of media, an artist, an event, or a venue based on the comparison.

18 Claims, 9 Drawing Sheets

(56) References Cited

U.S. PATENT DOCUMENTS

| | | | |
|---|---|---|---|
| 9,990,413 B2 | 6/2018 | Jung et al. | |
| 10,049,663 B2 | 8/2018 | Orr et al. | |
| 10,223,358 B2 | 3/2019 | Vartakavi et al. | |
| 11,127,028 B1* | 9/2021 | Smith | G06Q 30/0207 |
| 2012/0030159 A1* | 2/2012 | Pilaszy | G06F 16/951 |
| | | | 706/46 |
| 2012/0259683 A1 | 10/2012 | Cochran et al. | |
| 2013/0290110 A1* | 10/2013 | LuVogt | G06F 16/9535 |
| | | | 705/14.66 |
| 2013/0339877 A1 | 12/2013 | Skeen et al. | |
| 2014/0330848 A1 | 11/2014 | Chen et al. | |
| 2016/0162565 A1 | 6/2016 | Jung et al. | |
| 2016/0275594 A1* | 9/2016 | Mullakkara Azhuvath | |
| | | | G06F 16/24578 |
| 2016/0335266 A1* | 11/2016 | Ogle | G06F 16/4387 |
| 2017/0358302 A1 | 12/2017 | Orr et al. | |
| 2018/0049001 A1* | 2/2018 | Volozh | G01S 5/0036 |
| 2018/0330733 A1 | 11/2018 | Orr et al. | |
| 2018/0349386 A1* | 12/2018 | Circlaeys | H04N 21/41407 |
| 2019/0318304 A1* | 10/2019 | Sewak | G06N 3/0454 |
| 2020/0004835 A1* | 1/2020 | Ramanath | G06F 16/9535 |
| 2020/0410012 A1* | 12/2020 | Moon | G06N 3/049 |

FOREIGN PATENT DOCUMENTS

| | | |
|---|---|---|
| KR | 20180015586 A | 2/2018 |
| WO | 20210108166 A1 | 6/2021 |

OTHER PUBLICATIONS

International Seaching Authority, "International Search Report", issued in connection with International Application No. PCT/US2020/060846, dated Mar. 5, 2021 (3 pages).

International Seaching Authority, "Written Opinion of the International Searching Authority", issued in connection with International Application No. PCT/US2020/060846, dated Mar. 5, 2021 (4 pages).

"Local Music Discovery," MegsRadio.fm, published on Apr. 13, 2018, retrieved from the Wayback Machine on Dec. 29, 2021 (1 page).

Barthet et al., "Moodplay: An Interactive Mood-Based Musical Experience," 2015, Electronic Engineering and Computer Science, 9 pages.

* cited by examiner

METHODS AND APPARATUS TO GENERATE RECOMMENDATIONS BASED ON ATTRIBUTE VECTORS

FIELD OF THE DISCLOSURE

This disclosure relates generally to generating recommendations, and, more particularly, to methods and apparatus to generate recommendations based on attribute vectors.

BACKGROUND

Machine generation of recommendations of media, particularly music (e.g., songs) and associated entities (e.g., music artists), can be an advantageous value proposition or feature of, for example, music streaming services and other segments of the music industry. Machine generated recommendations of music and associated entities can be generated based on known tastes of a user (e.g., preferences, favorite songs).

BRIEF DESCRIPTION OF THE DRAWINGS

The figures are not to scale. In general, the same reference numbers will be used throughout the drawing(s) and accompanying written description to refer to the same or like parts.

Figure 1:
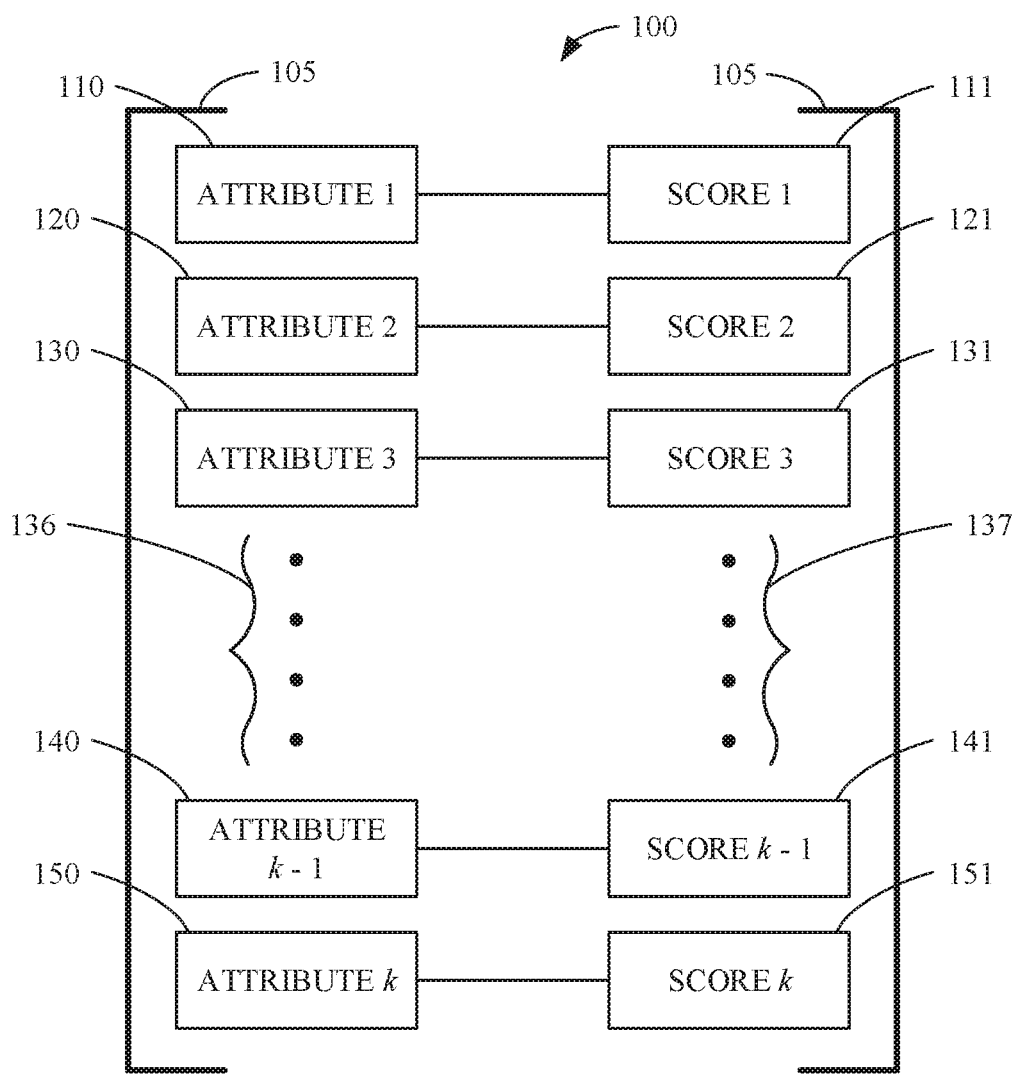
FIG. 1 is an example attribute vector that may be implemented in accordance with the teachings of this disclosure.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Recommendation systems seek to generate a recommendation for a user based on, for example, determined characteristics and/or history of the user (e.g., musical listening history, event attendance history, venue attendance history, etc.). Recommendation systems disclosed herein use a content-based approach to generate recommendations of, for example, media, artists, events, and venues. In some examples, the media, artists, events, and venues are musical in nature (e.g., relating to songs, bands, music performance, and music venues). Content-based approaches to recommendation systems are advantageous compared to other methods (e.g., collaborative methods), for example, because computation time is typically lower. Further, collaborative methods for recommendation systems often suffer from a cold start problem, wherein an initial user base may be of insufficient size and/or depth to draw appropriate recommendations. Content-based approaches to recommendation systems of late have failed to include features that accurately account for the great number of nuances that exist in user preferences and have failed to set forth a logical method for synthesizing and querying recommendations of higher level entities (e.g., entities further removed from a media sample) like events and venues.

In contrast to existing recommendation systems, example recommendation systems disclosed herein provide a variety of weighting options to better suit known inputs to the recommendation systems. In some examples, recommendation systems disclosed herein include synthesis techniques to aggregate (e.g., combine) media sources to form recommendations of greater complexity (e.g., events and venues). In some examples, recommendation systems disclosed herein have the ability to weigh objective factors (e.g., venue comfortability and/or geographic distance) along with subjective factors (e.g., compatibility with musical tastes).

Some examples disclosed herein generate various descriptive attribute vectors for media samples and associated entities (e.g., artists, events, venues, event and venue attendees). As used herein, an "attribute vector" refers to a numerical vector or array that carries descriptive information about an entity, wherein to express the presence of various "attributes" (e.g., aggressive, passive, peaceful, happy, etc.) by the entity. In some examples, media samples (e.g., songs, tracks, etc.) are first given a score for each attribute expressed in vector format corresponding to attributes to form media attribute vectors. In some examples, all other attribute vectors (e.g., attribute vectors besides media attribute vectors) are some combination, variation, synthesis, etc. of media attribute vectors.

FIG. 1 shows an example attribute vector 100 confined by brackets 105. The example attribute vector 100 can have any number of rows and as such is indexed through an ending row of k, wherein k can be any positive integer. The example attribute vector of FIG. 1 displays "attribute 1" 110, "score 1" 111, "attribute 2" 120, "score 2" 121, "attribute 3" 130, "score 3" 131, "attribute k−1" 140, "score k−1" 141, "attribute k" 150, and "score k" 151. However, there may be any number of attributes denoted within first braces 136 and any number of scores denoted within second braces 137.

Additionally, each attribute corresponds to the score having the same descriptive number (e.g., "attribute 1" 110 corresponds to "score 1" 111; "attribute k" 150 corresponds to "score k" 151). In some examples, for computational purposes, the attributes (e.g., the descriptive words) are contained in vectors separate from the scores. In these examples, the indexing (e.g., 1 through k) of each vector determines the correlation between scores and attributes. In some examples there may be fewer than the five attributes and respective scores pictured in this example. In some examples, there may be any number of attributes (e.g., ten attributes, one hundred attributes, one thousand attributes, etc.), each attribute having a respective score.

In some examples, the attribute vector 100 of FIG. 1 is either a media attribute vector, an attendee attribute vector, an event attribute vector, or a venue attribute vector. In some examples, media attribute vectors of the format of the attribute vector 100 are created through manual rating of media samples (e.g., songs or tracks). For example, this manual rating may be completed by a human employee, or crowdsourced from human participants (e.g., rated by a plurality of humans), or some variation thereof.

In some examples, an attribute such as "attribute 1" 110 or "attribute k" 150 may be specified or otherwise indicated as "peaceful" (e.g., by its position within the attribute vector 100 or by another indicator of dimensionality within the attribute vector 100), and score "score 1" 111 or "score k" 151 respectively may be specified or otherwise indicated by a numerical value (e.g., 210 out of a 255 point scale, or 0.25 within a range that spans −1.0 to +1.0) that quantifies the extent to which "peacefulness" is present or should be present. As another example, the "attribute 1" 110 or "attribute k" 150 may be specified or otherwise indicated as "aggressive," and its corresponding score "score 1" 111 or "score k" 151 respectively may be specified or otherwise indicated by another numerical value (e.g., 28 out of a 255 point scale, or −0.55 within a range that spans −1.0 to +1.0) that quantifies the extent to which "aggressiveness" is present or should be present. For example, attributes may be related to genres (e.g., "rock", "folk" "pop", "hip-hop", "jazz", "bluegrass", "Latin", etc.), moods (e.g., "mellow", "relaxed", "excited", "somber", "inspiring", etc.), and/or musical characteristics (e.g., "tempo", "vocals", "minor keys", "major keys", "rhythm", etc.).

Figure 2:
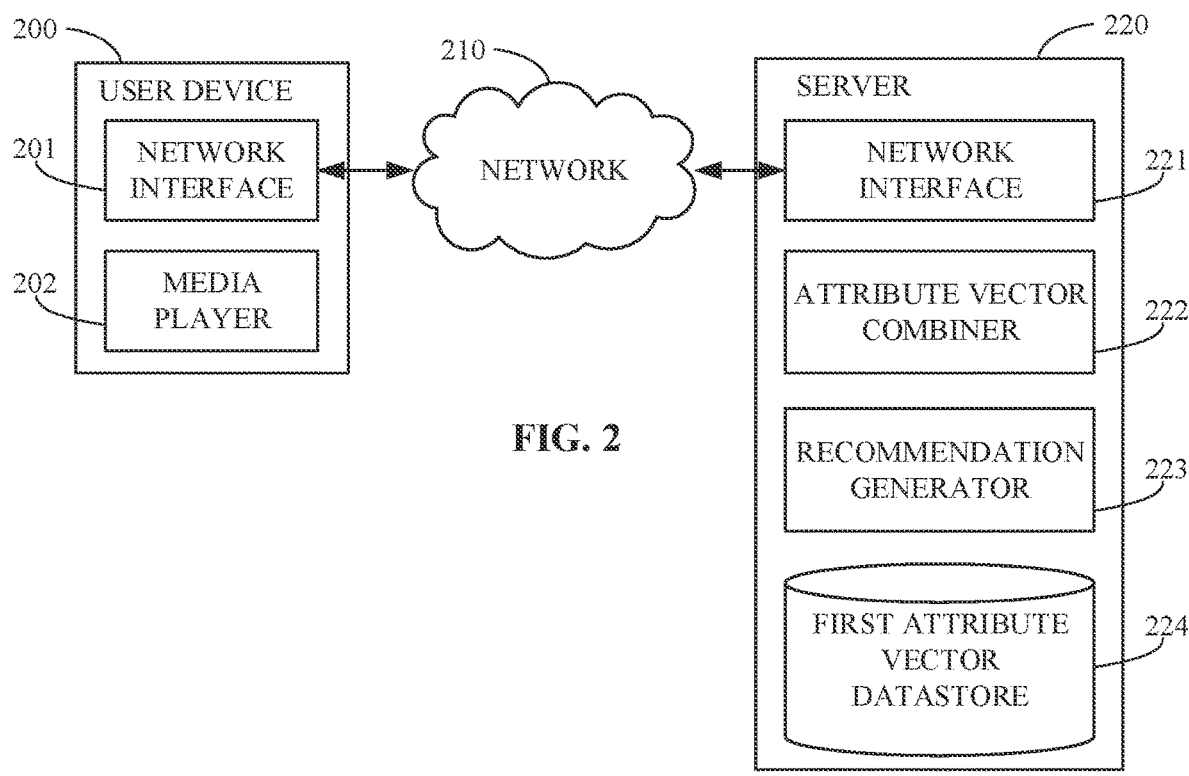
FIG. 2 is an example network diagram illustrating the relative locations of portions of a system to implement the teachings of this disclosure.

FIG. 2 is an example network diagram illustrating the relative locations of portions of a system to implement the teachings of this disclosure. FIG. 2 includes an example user device 200 communicatively coupled to an example server 220 via an example network 210. The example user device 200 includes a media player 202 and a first network interface 201 to interface with the network 210. For example, the user device 200 can be a smartphone, a tablet, a laptop computer, a desktop computer, and/or any other suitable device.

In the example of FIG. 2, the network 210 can be implemented by the Internet, a local area network (LAN), a wireless LAN (WLAN), and/or a virtual private network (VPN) and/or any other suitable means for implementing a network.

In the example of FIG. 2, the media player 202 of the user device 200 includes media samples such as, for example, songs or tracks. In some examples, the media player 202 is to include information about the past, present, and/or future event (e.g., concert or festival) and/or venue (e.g., concert venue or symphony hall) attendance of a user associated with the user device 200. In the example of FIG. 2, the media player 202 is an application (such as a mobile app) on the user device 200. In other examples, the media player 202 may be a stand-alone device. In this example, the media player 202 is implemented by a logic circuit such as, for example, a hardware processor. However, any other type of circuitry may additionally or alternatively be used such as, for example, one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

In the example of FIG. 2, the first network interface 201 of the user device 200 is to receive information from and/or transmit information to the server 220 and/or the network 210. For example, the first network interface 201 can transmit information pertaining to the media contained in the media player 202 and/or other pertinent information from the user device 200 to the network 210 and/or the server 220. For example, the first network interface 201 can facilitate the receipt of information by the user device 200 pertaining to recommendations of media, artists, events, playlists, and/or venues, etc. from the server 220 and/or the network 210. In some examples, the information may be formatted as a hypertext transfer protocol (HTTP) message. In other examples, any other suitable message format and/or protocol may additionally or alternatively be used such as, for example, a file transfer protocol (FTP), a simple message transfer protocol (SMTP), or an HTTP secure protocol (HTTPS), etc. In this example, the first network interface 201 includes a communication device such as a transmitter, a receiver, a transceiver, a modem, a residential gateway, a wireless access point, and/or a network interface to facilitate exchange of data with external machines (e.g., computing devices of any kind) via the network 210. The communication can be via, for example, an Ethernet connection, a digital subscriber line (DSL) connection, a telephone line connection, a coaxial cable system, a satellite system, a line-of-site wireless system, a cellular telephone system, etc.

In the illustrated example of FIG. 2, the example server 220 includes a second network interface 221, an attribute vector combiner 222, a recommendation generator 223, and an example first attribute vector datastore 224. For example, the server 220 can be a web server, a database server, a communications server, and/or a computing server and/or any other suitable server or combination thereof. In some examples, the example server 220 is to receive, via second network interface 221 and/or the network 210, information regarding the media samples, artists, events, and/or venues associated with an example user associated with the example user device 200. In some examples, this information is used as a partial or whole input to the example recommendation generator 223. In some examples, the recommendation generator 223 transmits recommendations of, for example, media samples, artists, events, and venues to the user device 200 via the network 210. In some examples, a quantity of attribute vectors in the format of the attribute vector 100 are stored locally, or alternatively are remotely accessible, by the first attribute vector datastore 224. In some examples, the first attribute vector datastore 224 may be read and/or written on by the attribute vector combiner 222 and the recommendation generator 223. In some examples, all aspects of the server 220 can access data (e.g., information regarding contained media samples) from the media player 202 of the user device 200, and any other aspect of the user device 200. The attribute vector combiner 222 and/or the recommendation generator 223 of the server 220 are described in further detail in connection with FIGS. 4 and/or 5.

In the example of FIG. 2, the second network interface 221 of the server 220 is to receive information from and/or transmit information to the user device 200 and/or the network 210. For example, the second network interface 221 can facilitate the receipt by the server 220 of information pertaining to the media contained in the media player 202 and/or other pertinent information from the user device 200 from the network 210 and/or the user device 200. For example, the second network interface 221 can transmit information from the server 220 pertaining to recommendations of media samples, artists, events, playlists, and/or venues, among others to the user device 220 and/or the network 210.

In some examples, the information may be formatted as a hypertext transfer protocol (HTTP) message. In other examples, any other suitable message format and/or protocol may additionally or alternatively be used such as, for example, a file transfer protocol (FTP), a simple message transfer protocol (SMTP), or an HTTP secure protocol (HTTPS), etc. In some examples, the second network interface 221 includes a communication device such as a transmitter, a receiver, a transceiver, a modem, a residential gateway, a wireless access point, and/or a network interface to facilitate exchange of data with external machines (e.g., computing devices of any kind) via the network 210. The communication can be via, for example, an Ethernet connection, a digital subscriber line (DSL) connection, a telephone line connection, a coaxial cable system, a satellite system, a line-of-site wireless system, a cellular telephone system, etc.

The example first attribute vector datastore 224 of the illustrated example of FIG. 2 is implemented by any memory, storage device, and/or storage disc for storing data such as, for example, flash memory, magnetic media, optical media, solid state memory, hard drive(s), thumb drive(s), etc. Furthermore, the data stored in the example first attribute vector datastore 224 may be in any data format such as, for example, binary data, comma delimited data, tab delimited data, structured query language (SQL) structures, etc. While, in the illustrated example, the first attribute vector datastore 224 is illustrated as a single device, the example attribute vector datastore and/or any other data storage devices described herein may be implemented by any number and/or type(s) of memories. In the example of FIG. 2, the first attribute vector datastore 224 stores machine-readable numerical vectors and/or arrays including scores associated with an attribute vector (e.g., for computational purposes, a numerical attribute vector), and further stores metadata describing the name of the attribute (e.g., strings of text indicating peaceful or aggressive, etc.) associated with each index of the numerical vector.

Figure 3:
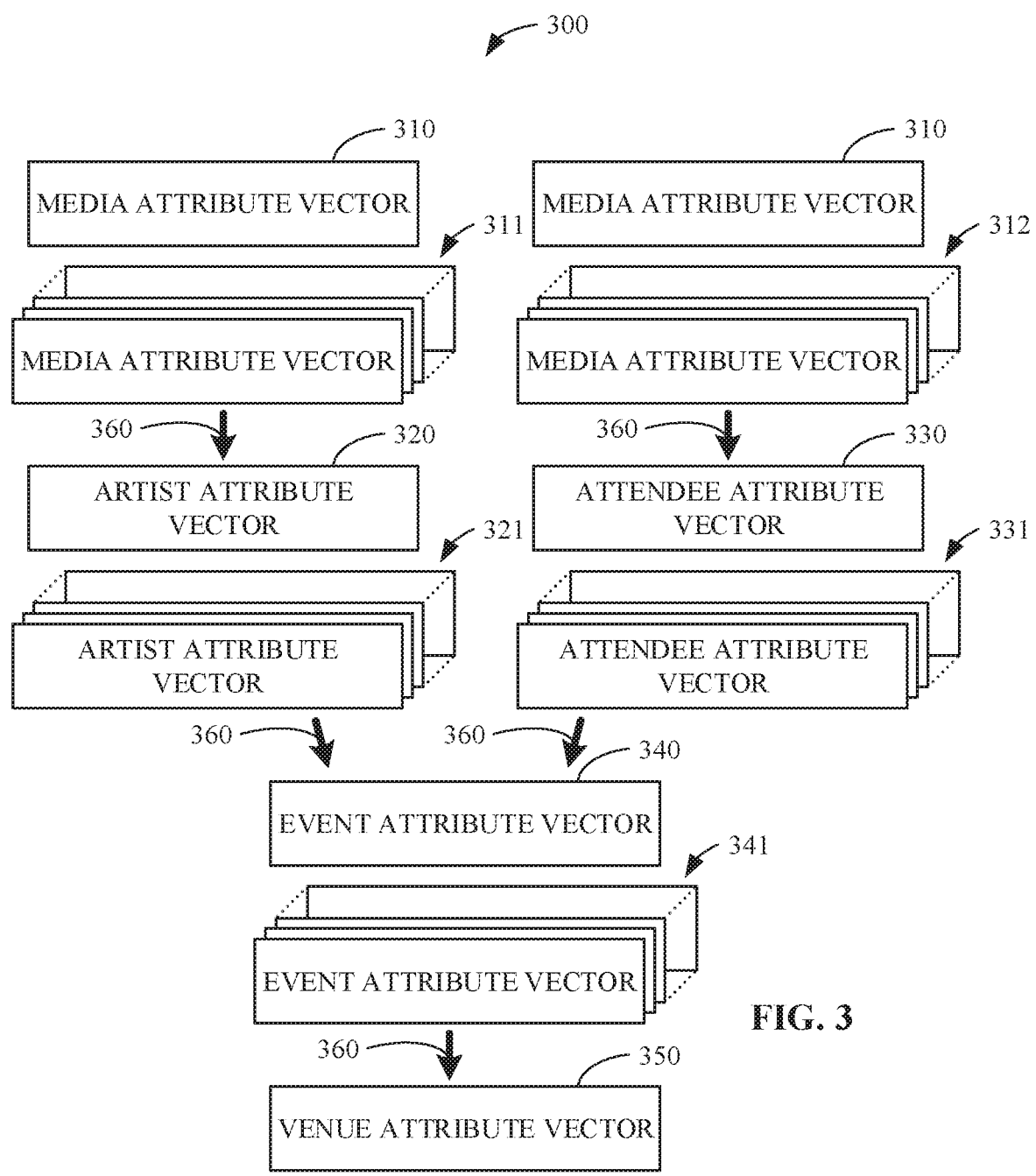
FIG. 3 is a schematic illustrating how various attribute vectors can be combined and synthesized.

FIG. 3 is a schematic illustration of an example process 300 showing how various attribute vectors can be combined and synthesized. The example process 300 includes example media attribute vectors 310, example first media attribute vectors 311, example second media attribute vectors 312, an example artist attribute vector 320, example artist attribute vectors 321, an example attendee attribute vector 330, example attendee attribute vectors 331, an example event attribute vector 340, example event attribute vectors 341, and an example venue attribute vector 350. In the example of FIG. 3, each vector that is synthesized through some combination (e.g., weighted average, unweighted average, etc.) of a stack of vectors (e.g., artist attribute vectors 321) of the previous category, indicated by arrows 360. In some examples, there exists a plurality of the media attribute vectors 310 associated with each relevant piece of media (e.g., media sample) to the process 300. In some examples, media attribute vectors are created with or without knowledge of the associated artists, attendees, events, and venues of the process 300. In some examples, relevant pieces of media to the process 300 include but are not limited to media samples (e.g., songs, tracks) associated artists, attendees, events, and venues.

In some examples, a media attribute vector 310 may be associated with a media sample. In some examples, a media sample could be a song, track, mixtape, or any other musical work. In some examples, a media sample could be a music video. In some examples, a media sample could be a poem, piece of literature, or any other artistic work.

In some examples, the artist attribute vector 320 may be associated with an artist. In some examples, an artist is a singer, songwriter, producer, band, orchestra, disc jockey (DJ), performer, or any other entity that creates media samples. In these examples, the artist is associated with (e.g., performs at) an event at a venue.

In some examples, the attendee attribute vector 330 may be associated with an attendee. In some examples, an attendee is a person who attends (e.g., in person, virtually, etc.) an event including performances by an artist. In some examples, an attendee is associated with various media samples and the corresponding second media attribute vectors 312.

In some examples, the event attribute vector 340 may be associated with an event. In some examples, an event occurs at a time and place (e.g., at a physical or virtual venue) and includes a musical performance or musical performances by an artist or artists and further is attended by attendees.

In some examples, the venue attribute vector 350 may be associated with a venue. In some examples, a venue is a location (e.g., a physical location) where events occur. In some examples, a venue may be a location only during certain times. For example, a location (e.g., a concert venue, nightclub, or bar) may have Latin night on Monday and Bluegrass night on Tuesday every week, with each particular Monday Latin night being a singular event and each particular Tuesday Bluegrass night being a singular event. In this example, the Latin night (e.g., set of Mondays at the location) and Bluegrass night (e.g., set of Tuesdays at the location) are each a separate venue for the purposes of the process 300.

In some examples, the artist attribute vector 320, attendee attribute vector 330, event attribute vector 340 and/or the venue attribute vector 350 may additionally or alternatively be associated with certain clusters of their component vectors. For example, an artist may generally evoke very different attributes throughout their songs and/or albums. For example, a Bluegrass artist may release one or more Christmas albums which evoke very different attributes from the remainder of the artist's albums. In this example, an algorithm may be implemented to cluster media attribute vectors associated with the artist into discrete or overlapping clusters of vectors (e.g., a first cluster associated with the Christmas album(s) and a second cluster associated with the remainder of the artist's album(s).). For example, it may be desirable to discard certain clusters from aggregation processes that deviate significantly from other clusters and/or attribute vectors. Methods and apparatus directed to selecting balanced clusters of descriptive vectors (e.g., for example, attribute vectors) are described in U.S. Pat. No. 10,223,358, which is hereby incorporated herein by reference in its entirety.

In some examples, the first media attribute vectors 311 may be a collection of media attribute vectors 310 associated with a particular artist (e.g., a band, singer, disc jockey (DJ), orchestra, etc.). In such examples, the first media attribute vectors 311 may be aggregated together (e.g., averaged in a weighted or unweighted manner) to produce the artist attribute vector 320. In some examples, a plurality of artist attribute vectors 320 are created using this process. Additionally or alternatively, a plurality of artist attribute vectors 320 may be produced in association with a particular artist. For example, an algorithm may be instituted to cluster first media attribute vectors 311 (e.g., a first tier media attribute vector) associated with an artist into two or more discrete or overlapping clusters (e.g., a second tier of media attribute vectors). In this example, two or more artist attribute vectors may be produced associated with a particular artist (e.g., a first artist attribute vector 320 associated with a first cluster of an artist, a second artist attribute vector 320 associated with a second cluster of the artist, etc.).

In some examples, the second media attribute vectors 312 may be a collection of media attribute vectors 310 associated with a particular attendee (e.g., an attendee of an event such as a concert or show). In these examples, the second media attribute vectors 312 may be aggregated together (e.g., averaged in a weighted or unweighted manner) to produce the attendee attribute vector 330. In some examples, a plurality of attendee attribute vectors 330 are created using this process. Additionally or alternatively, two or more attendee attribute vectors 330 may be produced associated with two or more respective clusters of the second media attribute vectors 312 associated with an attendee.

In some examples, the artist attribute vectors 321 may be a collection of artist attribute vectors 320 associated with a particular event (e.g., concert, show, music festival etc.). In these examples, the attendee attribute vectors 331 may be a collection of attendee attribute vectors 330 associated with the particular event. In these examples, the artist attribute vectors 321 may be aggregated together (e.g., averaged in a weighted or unweighted manner) with the attendee attribute vectors 331 to produce the event attribute vector 340. In some examples, a plurality of event attribute vectors 340 are created using this process. Additionally or alternatively, two or more event attribute vectors 340 may be produced associated with two or more respective clusters of the attendee attribute vectors 331 and artist attribute vectors 321 associated with an event.

In some examples, the second media attribute vectors 312 may be a collection of media attribute vectors 310 associated with all the attendees of an event. In these examples, the second media attribute vectors 312 may be aggregated to get an attendee attribute vector for the event. In these examples, the attendee attribute vector and one or more artist attribute vectors associated with one or more artists performing at the event may be aggregated together to obtain an event attribute vector associated with the event.

In some examples, the event attribute vectors 341 may be a collection of event attribute vectors 340 associated with a particular venue (e.g., a concert hall, nightclub, Bluegrass night, etc.). In these examples, the event attribute vectors 341 may be aggregated together (e.g., averaged in a weighted or unweighted manner) to produce the venue attribute vector 350. In some examples, a plurality of venue attribute vectors 350 are created using this process. Additionally or alternatively, a plurality of venue attribute vectors 350 may be produced associated with a particular venue (e.g., a concert hall, Bluegrass night, etc.). For example, an algorithm may be instituted to cluster event attribute vectors 341 associated with a venue into two or more discrete or overlapping clusters. In this example, two or more venue attribute vectors may be produced associated with a particular venue (e.g., a first venue attribute vector 350 associated with a first cluster of a venue, a second venue attribute vector 350 associated with a second cluster of a venue, etc.). In this manner, when the venue associated with the clusters of attribute vectors is a location (e.g., concert venue, nightclub, or bar, etc.), the clusters may be associated with the location only at certain times (e.g., a first venue attribute vector 350 associated with a first cluster associated with Bluegrass night at a venue, a second venue attribute vector 350 associated with a second cluster associated with Latin night at the venue, etc.).

It is hereby noted that the set of first media attribute vectors 311, set of second media attribute vectors 312, set of artist attribute vectors 321, set of attendee attribute vectors 331, and/or set of event attribute vectors 341 could include one, two, three, ten, one hundred, or any other number of attribute vectors.

An example manner of aggregating attribute vectors is averaging them without weighting and is shown in Equation 1 below.

$$v_{Aggregated} = \frac{\sum_{i=1}^{n}(v_{Attribute})_i}{n} \qquad \text{Equation 1}$$

In the example of Equation 1, the variable $v_{Aggregated}$ represents an aggregated attribute vector (e.g., artist attribute vector 320). $v_{Attribute}$ represents one of a set of component attribute vectors (e.g., first media attribute vectors 311) used to generate the aggregated attribute vector $v_{Aggregated}$. Variable n in Equation 1 represents the quantity of component attribute vectors $v_{Attribute}$ that are being aggregated (e.g., averaged) to form the aggregated attribute vector $v_{Aggregated}$. To complete this computation, the component attribute vectors $v_{Attribute}$ are numerical vectors including scores and have dimensions of 1 by k, or, alternatively k by 1. In some examples, this requires that a corresponding set of attributes of the same dimension as $v_{Attribute}$ be stored.

In an example weighted processes, certain component attribute vectors (e.g., a media attribute vector 310 of the first media attribute vectors 311) are selected that are deemed of increased importance to the desired aggregated attribute vector (e.g., artist attribute vector 320). In some examples, linear multipliers (e.g., weights) are applied to attribute vectors deemed of increased importance, thereby increasing the relevance of the corresponding attribute vector to the weighting process. An example formula for generating a weighted average is shown below in Equation 2:

$$v_{Aggregated} = \frac{\sum_{i=1}^{n}(v_{Attribute})_i \cdot W_i}{\sum_{i=1}^{n} W_i} \qquad \text{Equation 2}$$

In the example of Equation 2, the variable $v_{Aggregated}$ represents an aggregated attribute vector (e.g., artist attribute vector 320). $v_{Attribute}$ represents one of a set of component attribute vectors (e.g., first media attribute vectors 311) used to generate the aggregated attribute vector $v_{Aggregated}$. The variable $W_i$ represents a linear multiplier (i.e. scalar) weight factor. Variable n in Equation 2 represents the quantity of component attribute vectors $v_{Attribute}$ that are being aggregated (e.g., averaged) to form the aggregated attribute vector $v_{Aggregated}$. To complete this computation, the component attribute vectors $v_{Attribute}$ are numerical vectors including scores and have dimensions of 1 by k, or, alternatively k by 1. In some examples, this requires that a corresponding set of attributes (e.g., strings of text indicating peaceful or aggressive, etc.) of the same dimension as $v_{Attribute}$ be stored.

In some examples, a relatively low weight factor $W_i$ (e.g., 0.25) can be used to deemphasize a component attribute vector $v_{Attribute}$ deemed of low relevance. In some examples, a relatively high weight factor $W_i$ (e.g., 3) can be used to emphasize a component attribute vector $v_{Attribute}$.

In some examples, in the generation (e.g., averaging, aggregation, etc.) of the artist attribute vector 320 shown in FIG. 3, certain media attribute vectors of the first media attribute vectors 311 that are associated with media samples more recently released by the artist may be weighted higher. In some examples, recent set lists (e.g., lists of music samples performed by an artist at an event, etc.) are also more heavily weighted. In some examples, in the generation (e.g., averaging, aggregation, etc.) of the event attribute vector 340, ones of the artist attribute vectors 321 associated with artists who preform later during an event (e.g., headliners, closing acts, etc.) are more heavily weighted. In some examples, event and venue attribute vectors associated with events and venues geographically closer to a user associated with a user device (e.g., user device 200) can be more heavily weighted. In some examples, any objective factors (e.g., venue comfortability and/or geographic distance) along with subjective factors (e.g., compatibility with musical tastes) may be used to generate weights. In some examples, any desired qualitative or quantitative factor can be used to weight certain attribute vectors higher than others during the process 300.

In some examples, component attribute vectors (e.g., first media attribute vectors 311, second media attribute vectors 312, artist attribute vectors 321, attendee attribute vectors 331 and/or event attribute vectors 341, etc.) may be clustered into two or more discrete or overlapping clusters based on the relative likeness of attributes (e.g., relative magnitudes and/or signs of attributes, etc.) of the component attribute vectors. In these examples, the component attribute vectors may collectively define a first tier of attribute vectors (e.g. a root cluster) and the two or more discrete or overlapping clusters (e.g., subsets) of the component attribute vectors may collectively define a second tier of attribute vectors. For example, certain clusters and/or attribute vectors within a cluster may be weighted higher than others.

Figure 4:
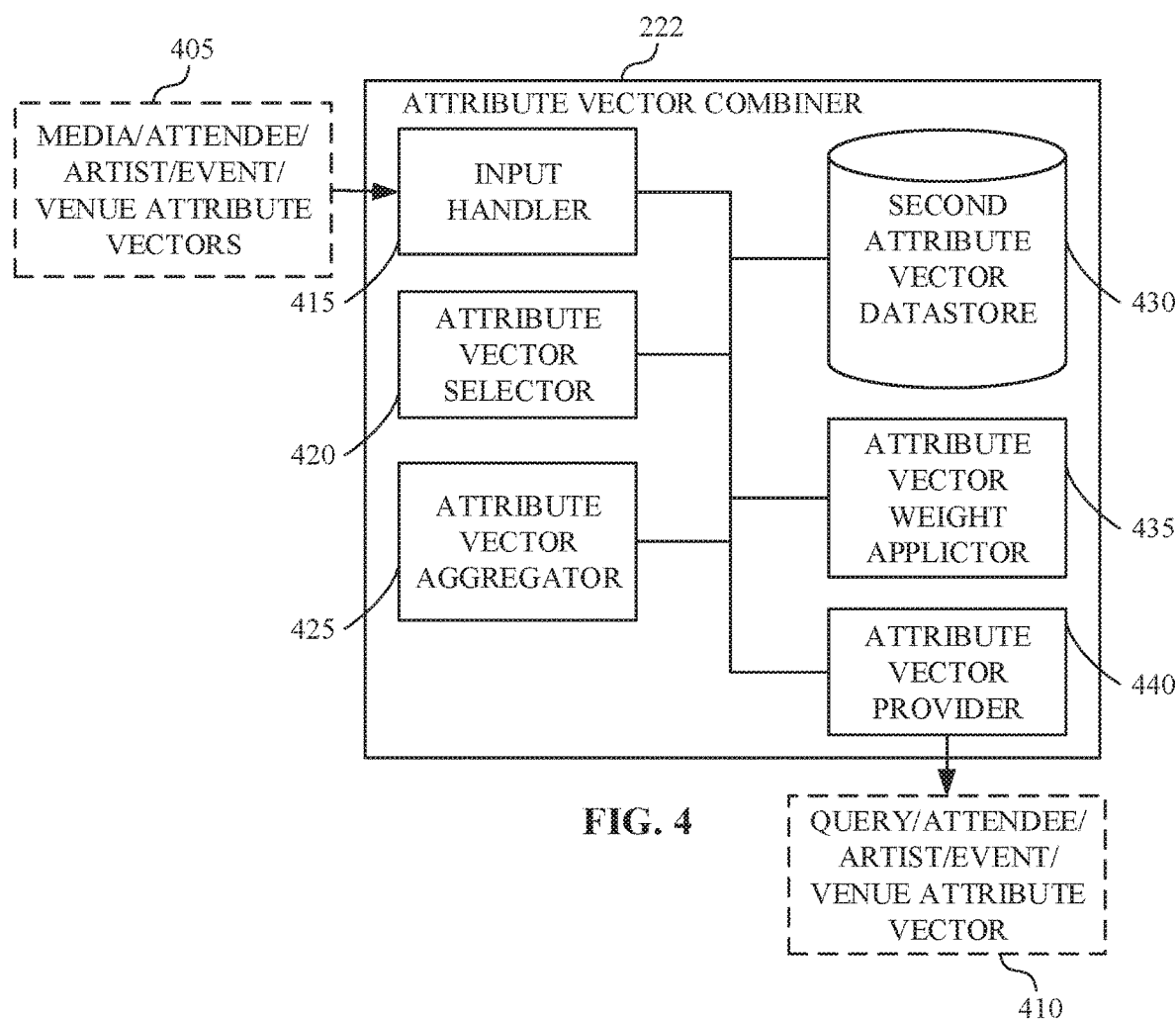
FIG. 4 is a block diagram of an example attribute vector combiner to combine (e.g., aggregate) some of media, attendee, artist, and/or event attribute vectors.

FIG. 4 is a block diagram of an example implementation of the attribute vector combiner 222 to combine (e.g., aggregate) some of media, attendee, artist, and/or event attribute vectors. The example attribute vector combiner 222 includes a first input handler 415, attribute vector selector 420, attribute vector aggregator 425, second attribute vector datastore 430, attribute vector weight applicator 435, and attribute vector provider 440. The attribute vector combiner 222 receives media, attendee, artist, event, and/or venue attribute vectors 405 as an input and outputs query, attendee, artist, event, and/or venue attribute vectors.

The inputs to the attribute vector combiner 222 are the media, attendee, artist, event, and/or venue attribute vectors 405. The media, attendee, artist, event, and/or venue attribute vectors 405 are grouped as such because the attribute vector aggregator 425 will follow a similar protocol (e.g., a process 700 of FIG. 7) in combining attribute vectors regardless of entity (e.g., media, attendee, artist, event) to which the attribute vector is associated. In some examples, the media, attendee, artist, event, and/or venue attribute vectors 405 are input into the attribute vector combiner 222 according to the process 300 of FIG. 3. In some examples, the output of the selected input attribute vectors is indicated by arrows 360. For example, in order to produce the artist attribute vector 320 as an output, the first media attribute vectors 311 are input into the attribute vector combiner 222.

The example first input handler 415 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). The example first input handler 415 accesses the media, artist, attendee, event, and/or venue attribute vectors 405. In some examples, the media, artist, attendee, event, and/or venue attribute vectors 405 include a machine-readable numerical vector or array format (e.g., Comma Separated Values (CSV)) including the scores associated with the attribute vector. In some examples, the attribute vectors are in a format to enable processing (e.g., aggregating, averaging). In some examples, the scores correspond to respective attributes (e.g., aggressive, peaceful, etc.) via their index. In some examples, the media, artist, attendee, event, and/or venue attribute vectors 405 are stored locally or remotely with respect to the server 220 prior to being accessed.

In some examples, the media, attendee, artist, event, and/or venue attribute vectors 405 are stored in the second attribute vector datastore 430 after being accessed by the first input handler 415.

The example attribute vector selector 420 in the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). In some examples, the attribute vector selector 420 selects the required attribute vectors that are needed for a given combination. In some examples, the attribute vector selector 420 selects the example first media attribute vectors 311, the example second media attribute vectors 312, or the example event attribute vectors 341. In some examples, the attribute vector selector 420 selects the example artist attribute vectors 321 and the example attendee attribute vectors 331. Additionally, the attribute vector selector 420 may cluster the selected attribute vectors into two or more discrete or overlapping clusters. In some examples, the attribute vector selector 420 selects the attribute vectors (e.g., media, artist, attendee, event, and/or venue vectors) associated with the media player 202 of the user device 200 for query.

The example attribute vector weight applicator 435 in the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). In some examples, the attribute vector weight applicator 435 is to apply weights (e.g., scalars, linear multipliers, etc.) to ones of attribute vectors and/or clusters selected by the attribute vector selector 420.

The example attribute vector aggregator 425 in the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). In some examples, the example attribute vector aggregator 425 implements the averaging formulas of Equation 1 and Equation 2 utilizing the attribute vectors and/or clusters selected by the attribute vector selector 420 and the weights assigned by the attribute vector weight applicator 435. In other examples, the attribute vector aggregator 425 aggregates the attribute vectors and/or clusters of attribute vectors in any other suitable manner. In some examples, the attribute vector aggregator 425 produces a query, attendee, artist, event, and/or venue attribute vector 410 which is provided by the attribute vector provider 440 to local or remote storage or processing elements. Additionally or alternatively, the attribute vector aggregator 425 produces two or more attribute vectors associated with two or more respective clusters of attribute vectors associated with an artist, attendee, event and/or venue.

In some examples, the attribute vector combiner 222 receives the example first set of first media attribute vectors 311 and outputs the example artist attribute vector 320 and/or two or more attribute vectors associated with two or more respective clusters of the first media attribute vectors 311 (e.g., subsets of the first media attribute vectors 311) associated with an artist. In some examples, the attribute vector combiner 222 receives the example second set of second media attribute vectors 312 and outputs the example attendee attribute vector 330 and/or two or more attribute vectors associated with two or more respective clusters of the second media attribute vectors 312 (e.g., subsets of the second media attribute vectors 312) associated with an attendee. In some examples, the attribute vector combiner 222 receives the artist attribute vectors 321 and the attendee attribute vectors 331 and outputs the example event attribute vector 340 and/or two or more attribute vectors associated with two or more clusters of the artist attribute vectors 321 and attendee attribute vectors 331 (e.g., subsets of the artist attribute vectors 321 and attendee attribute vectors 331) associated with an event. In some examples, the attribute vector combiner 222 receives the example set of event attribute vectors 341 and outputs the venue attribute vector 350 and/or two or more attribute vectors associated with two or more clusters of event attribute vectors 341 (e.g., subsets of the event attribute vectors 341) associated with a venue. In some examples, the attribute vector combiner 222 receives a set of attribute vectors and outputs a query attribute vector. In some examples, any of the aforementioned processes including the above specified inputs and outputs happen any number of times.

The example second attribute vector datastore 430 of the illustrated example of FIG. 4 is implemented by any memory, storage device, and/or storage disc for storing data such as, for example, flash memory, magnetic media, optical media, solid state memory, hard drive(s), thumb drive(s), etc. Furthermore, the data stored in the example second attribute vector datastore 430 may be in any data format such as, for example, binary data, comma delimited data, tab delimited data, structured query language (SQL) structures, etc. While, in the illustrated example, the second attribute vector datastore 430 is illustrated as a single device, the example attribute vector datastore and/or any other data storage devices described herein may be implemented by any number and/or type(s) of memories. In the example of FIG. 4, the second attribute vector datastore 430 stores machine-readable numerical vectors and/or arrays including scores associated with an attribute vector, and further stores metadata describing the name of the attribute (e.g., strings of text indicating a particular mood, etc.) associated with each index of the numerical vector.

Figure 5:
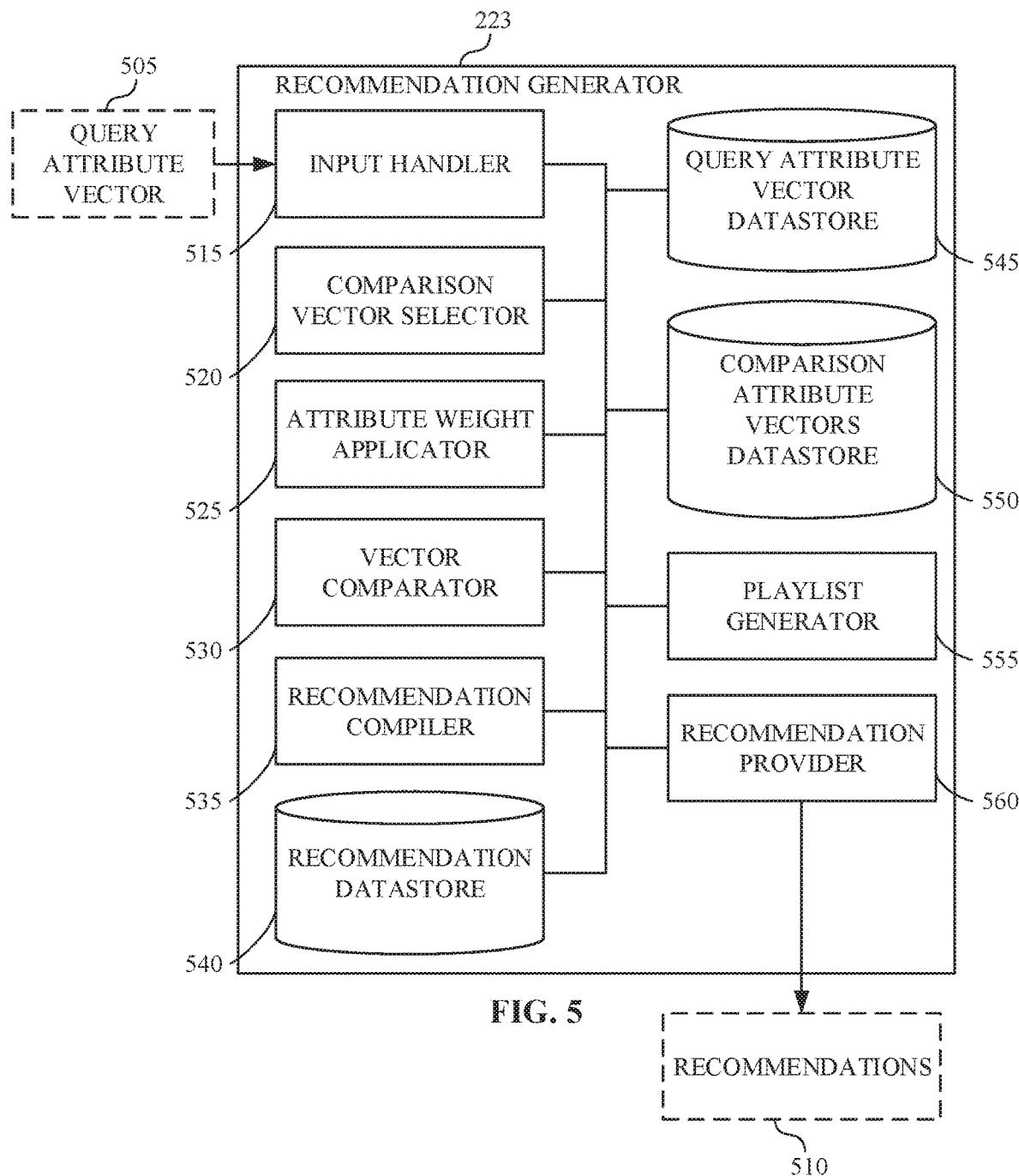
FIG. 5 is a block diagram of an example recommendation generator to generate a recommendation based on a query attribute vector.

FIG. 5 is a block diagram of an example implementation of the recommendation generator 223 to generate a recommendation 510 based on a query attribute vector 505. The example recommendation generator 223 includes a second input handler 515, comparison vector selector 520, attribute weight applicator 525, vector comparator 530, recommendation compiler 535, recommendation datastore 540, query attribute vector datastore 545, comparison attribute vectors datastore 550, playlist generator 555, and recommendation provider 560. The example recommendation generator 223 receives the query attribute vector 505 as an input and outputs the recommendations 510.

The example second input handler 515 of the illustrated example of FIG. 5 is implemented by a logic circuit such as, for example, a hardware processor. However, any other type of circuitry may additionally or alternatively be used such as, for example, one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

The example second input handler 515 accesses the query attribute vector 505. In some examples, the query attribute vector 505 is a machine-readable numerical vector or array format (e.g., Comma Separated Values (CSV)) including the scores associated with the attribute vector. In some examples, the attribute vectors are in a format to enable processing (e.g., aggregating, averaging). In some examples, the query attribute vector 505 is a synthesis of attribute vectors associated with the user device 200. In some examples, the scores correspond to respective attributes (e.g., aggressive, peaceful, etc.) via their index. In some examples, the query attribute vector 505 is stored locally or remotely with respect to the server 220 prior to being accessed. In some examples, the query attribute vector 505 is stored locally or remotely in the query attribute vector datastore 545 after being accessed.

The example comparison vector selector 520 in the illustrated example of FIG. 5 is implemented by a logic circuit such as, for example, a hardware processor. However, any other type of circuitry may additionally or alternatively be used such as, for example, one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

In some examples, the comparison vector selector 520 selects various media, artist, event, and venue attribute vectors to compare to the input query attribute vector 505. In some examples, the comparison vector selector 520 selects attribute vectors from the comparison attribute vectors datastore 550. In some examples, the comparison attribute vectors datastore 550 has remote access to a wide range of attribute vectors.

The example attribute weight applicator 525 in the illustrated example of FIG. 5 is implemented by a logic circuit such as, for example, a hardware processor. However, any other type of circuitry may additionally or alternatively be used such as, for example, one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

In some examples the attribute weight applicator 525 assigns higher or lower weights to certain attributes. For example, the attribute weight applicator 525 may be in communication with the attribute vector combiner 222 and notice trends associated with attribute vectors scraped from a media player 202 of the user device 200. For example, the attribute weight applicator 525 may recognize consistently high scores for an attribute (e.g., peaceful) and assign a higher weight to that attribute. In some examples, the attribute weight applicator 525 creates a machine-readable numerical vector or array format (e.g., Comma Separated Values (CSV)) including the weights associated with the attribute vector. In some examples, the weights in the vector are indexed according to the query attribute vector 505.

The example vector comparator 530 in the illustrated example of FIG. 5 is implemented by a logic circuit such as, for example, a hardware processor. However, any other type of circuitry may additionally or alternatively be used such as, for example, one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

In some examples, the vector comparator 530 compares attribute vectors selected by the comparison vector selector 520 to the query attribute vector 505. In some examples, the vector comparator 530 also considers a set of attribute weights (e.g., a vector of weights indexed according to the attribute vectors) generated by the attribute weight applicator 525. In other examples, no such set of weights is considered. In some examples, the vector comparator compares, with weighting, the query attribute vector with each of the selected comparison attribute vectors by taking the absolute value of the difference of the two vectors and multiplying each individual index of the resulting vector with the corresponding index of the vector of weights. In some examples, the comparison attribute vectors that resulted in the lowest score(s) are selected by the recommendation compiler 535, which subsequently stores the recommendations in the recommendation datastore 540.

The example recommendation compiler 535 in the illustrated example of FIG. 5 is implemented by a logic circuit such as, for example, a hardware processor. However, any other type of circuitry may additionally or alternatively be used such as, for example, one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

In some examples, the recommendation compiler 535 sends media samples associated the comparison media and artist attribute vectors that resulted the lowest scores when compared to the query attribute vector to the playlist generator 555. In some examples, the recommendation compiler 535 sends comparison event and venue attribute vectors directly to the recommendation provider 560.

The example recommendation provider 560 in the illustrated example of FIG. 5 is implemented by a logic circuit such as, for example, a hardware processor. However, any other type of circuitry may additionally or alternatively be used such as, for example, one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

In some examples, the recommendation provider sends one or more playlists generated by the playlist generator 555 and event and venue recommendations generated by the recommendation compiler 535 to a user device such as the user device 200.

The example query attribute vector datastore 545, comparison attribute vector datastore 550, and recommendation datastore 540 of the illustrated example of FIG. 5 is implemented by any memory, storage device, and/or storage disc for storing data such as, for example, flash memory, magnetic media, optical media, solid state memory, hard drive(s), thumb drive(s), etc. Furthermore, the data stored in the example second attribute vector datastore 430 may be in any data format such as, for example, binary data, comma delimited data, tab delimited data, structured query language (SQL) structures, etc. While, in the illustrated example, the query attribute vector datastore 545, comparison attribute vector datastore 550, and recommendation datastore 540 are each illustrated as a single device, the example query attribute vector datastore 545, comparison attribute vector datastore 550, recommendation datastore 540 and/or any other data storage devices described herein may be implemented by any number and/or type(s) of memories. In the example of FIG. 5, the query attribute vector datastore 545, comparison attribute vector datastore 550, and recommendation datastore 540 store machine-readable numerical vectors and/or arrays including scores associated with an attribute vector, and further store metadata describing the name of the attribute (e.g., strings of text indicating peaceful or aggressive, etc.) associated with each index of the numerical vector.

While an example manner of implementing the user device 200 is illustrated in FIG. 2, an example manner of implementing the server 220 is illustrated in FIG. 2, an example manner of implementing attribute vector combiner 222 is illustrated in FIG. 4, and an example manner of implementing the recommendation generator 223 is illustrated in FIG. 5, one or more of the elements, processes and/or devices illustrated in FIGS. 2, 4, and/or 5 may be combined, divided, re-arranged, omitted, eliminated and/or implemented in any other way. Further, the example first network interface 201, the example media player 202 and/or, more generally, the example user device 200 of FIG. 2, and/or the second network interface 221, the attribute vector combiner 222, the recommendation generator 223, and/or, more generally, the server 220 of FIG. 2, and/or the first input handler 415, the example attribute vector selector 420, the example attribute vector aggregator 425, the example attribute vector weight applicator 435, the example attribute vector provider 440 and/or, more generally, the example attribute vector combiner 222 of FIG. 4, and/or the example second input handler 515, the example comparison vector selector 520, the example attribute weight applicator 525, the example vector comparator 530, the example recommendation compiler 535, the example playlist generator 555, the example recommendation provider 560 and/or, more generally, the example recommendation generator 223 of FIG. 5 may be implemented by hardware, software, firmware and/or any combination of hardware, software and/or firmware.

Thus, for example, any of the example first network interface 201, the example media player 202 and/or, more generally, the example user device 200 of FIG. 2, and/or the example second network interface 221, the example attribute vector combiner 222, the example recommendation generator 223, and/or, more generally, the example server 220 of FIG. 2, and/or the first input handler 415, the example attribute vector selector 420, the example attribute vector aggregator 425, the example attribute vector weight applicator 435, the example attribute vector provider 440 and/or, more generally, the example attribute vector combiner 222 of FIG. 4, and/or the example second input handler 515, the example comparison vector selector 520, the example attribute weight applicator 525, the example vector comparator 530, the example recommendation compiler 535, the example playlist generator 555, the example recommendation provider 560 and/or, more generally, the example recommendation generator 223 of FIG. 5 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

When reading any of the apparatus or system claims of this patent to cover a purely software and/or firmware implementation, at least one of the example first network interface 201, the example media player 202 and/or, more generally, the example user device 200 of FIG. 2, and/or the example second network interface 221, the example attribute vector combiner 222, the example recommendation generator 223, and/or, more generally, the example server 220 of FIG. 2, and/or the example first input handler 415, the example attribute vector selector 420, the example attribute vector aggregator 425, the example attribute vector weight applicator 435, the example attribute vector provider 440 and/or, more generally, the example attribute vector combiner 222 of FIG. 4, and/or the example second input handler 515, the example comparison vector selector 520, the example attribute weight applicator 525, the example vector comparator 530, the example recommendation compiler 535, the example playlist generator 555, the example recommendation provider 560 and/or, more generally, the example recommendation generator 223 of FIG. 5 is/are hereby expressly defined to include a non-transitory computer readable storage device or storage disk such as a memory, a digital versatile disk (DVD), a compact disk (CD), a Blu-ray disk, etc. including the software and/or firmware.

Further still, the example user device 200 of FIG. 2, the example server 220 of FIG. 2, the example attribute vector combiner 222 of FIG. 4 and/or the example recommendation generator 223 of FIG. 5 may include one or more elements, processes and/or devices in addition to, or instead of, those illustrated in FIGS. 2, 4, and/or 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
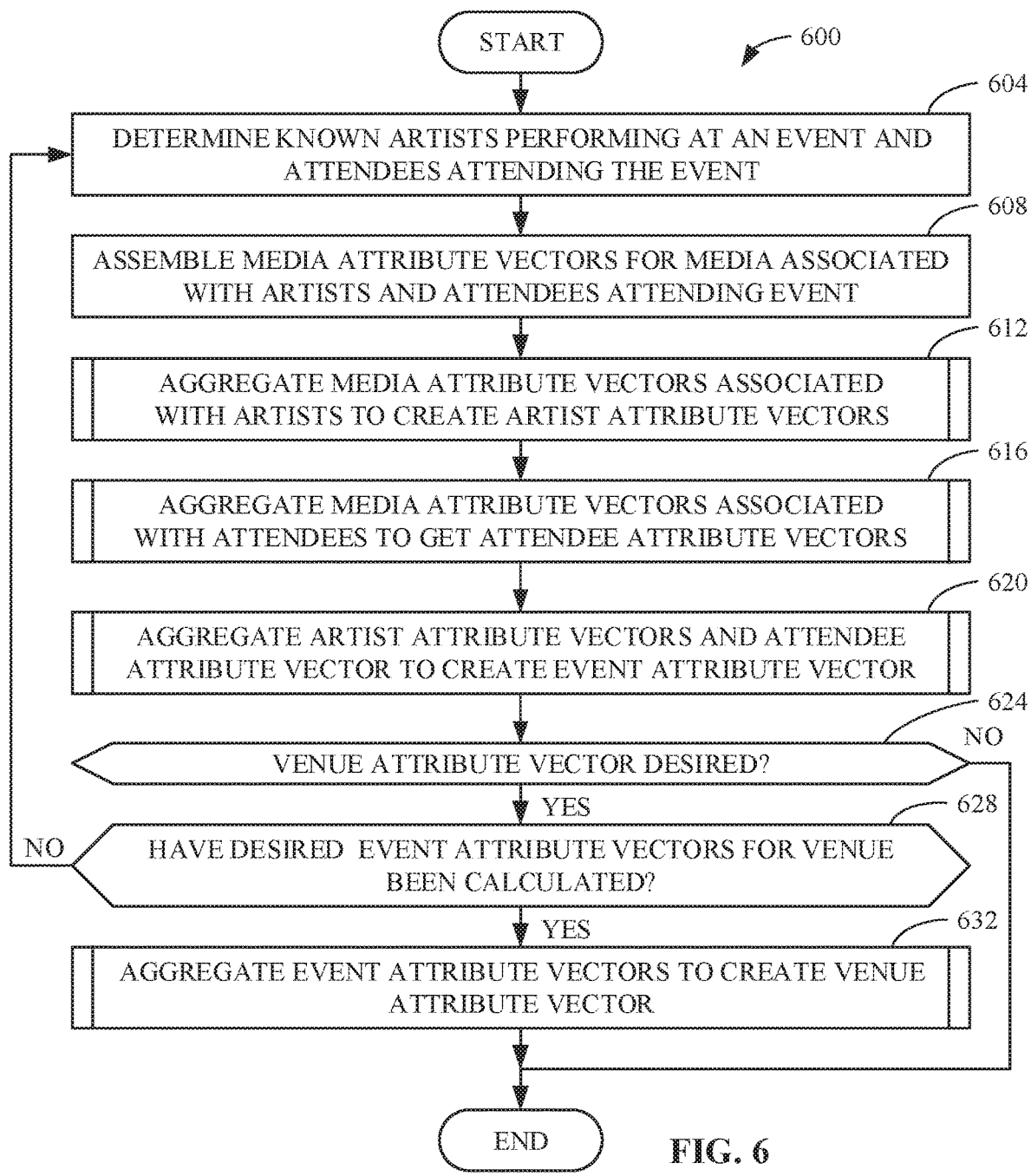
FIG. 6 is a flowchart representative of machine readable instructions which may be executed to implement the attribute vector combiner of FIG. 4 to generate event and venue attribute vectors.
Figure 7:
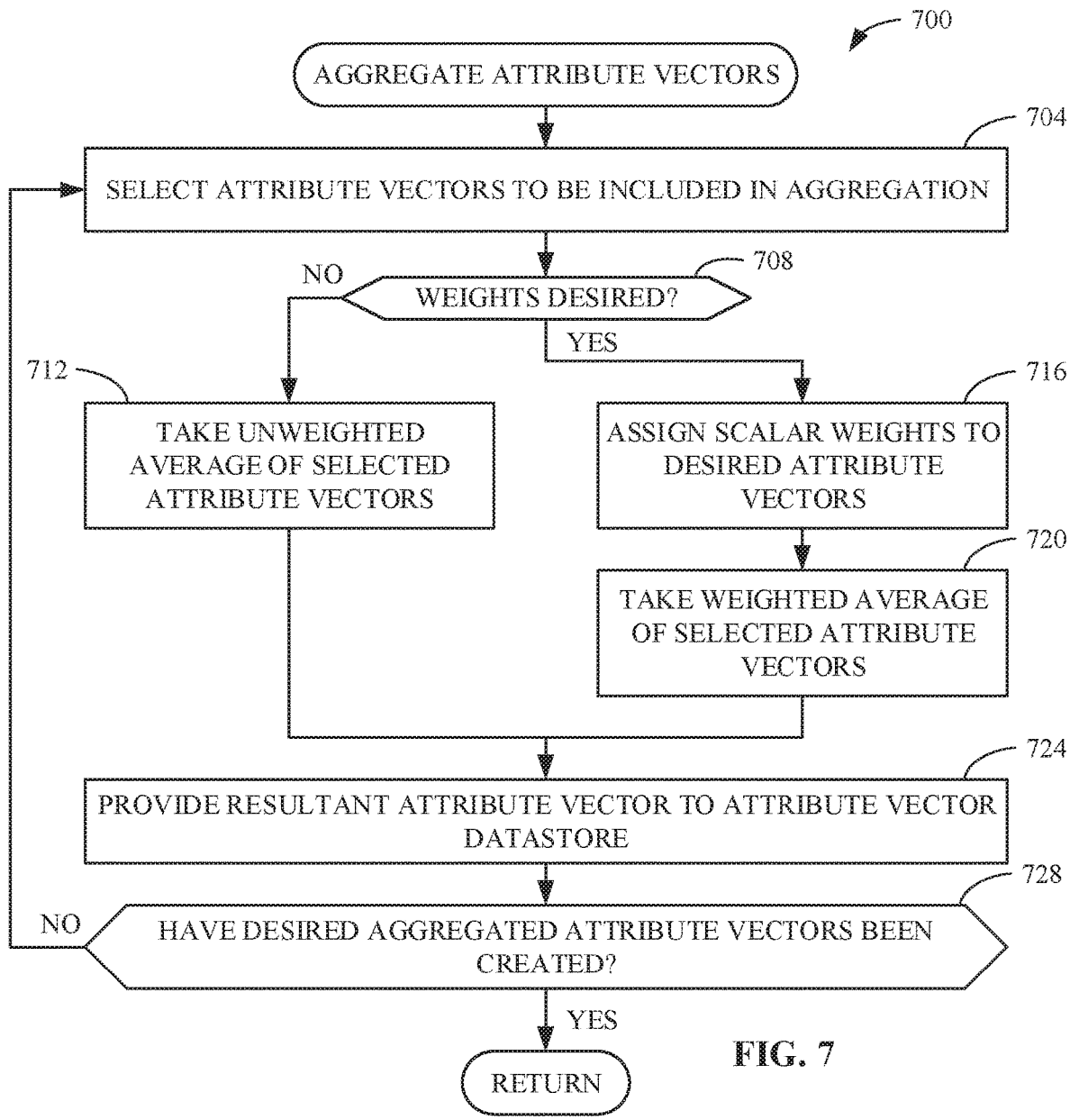
FIG. 7 is a flowchart representative of machine readable instructions which may be executed to implement the attribute vector combiner of FIG. 4 to aggregate attribute vectors.

Flowcharts representative of example hardware logic, machine readable instructions, hardware implemented state machines, and/or any combination thereof for implementing the example attribute vector combiner 222 of FIG. 4, and/or the example recommendation generator 223 of FIG. 5 are shown in FIGS. 6, 7, and/or 8. The machine readable instructions may be one or more executable programs or portion(s) of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 6, 7, and/or 8, many other methods of implementing the example attribute vector combiner 222 of FIG. 4 and/or the example recommendation generator 223 of FIG. 5 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 6, 7, and/or 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

In the example of FIGS. 4 and/or 5, the recommendation generator 223 can implement means for generating a recommendation. The attribute vector aggregator 425 can implement means for aggregating. The vector comparator 530 can implement means for comparing. The recommendation compiler 535 can implement means for compiling. The recommendation provider 560 can implement means for providing one or more recommendations.

FIG. 6 is a flowchart representative of machine readable instructions which may be executed to enable the user device 200, the server 220, and the attribute vector combiner 222 to produce attribute vectors such as the query, attendee, artist, event, and/or venue attribute vector 410. An example process 600 of FIG. 6 begins when the attribute vector selector 420 of the attribute vector combiner 222 determines known artists and attendees attending an event (e.g., a concert, show, festival, etc.). (Block 604). Next, the attribute vector selector 420 directs the first input handler 415 to assemble the media attribute vectors associated with the known artists and attendees attending the event. (Block 608). In some examples, these media attribute vectors are the attribute vectors 405 and serve as a first input to the attribute vector combiner 222. In some examples, according to the process 300, the media attribute vectors associated with an artist are the first media attribute vectors 311. Similarly, in some examples, the media attribute vectors associated with the attendees are the second media attribute vectors 312. In this example, attribute vectors are stored in the second attribute vector datastore 430 after being handled by the first input handler 415 so as to be available to other aspects of the attribute vector combiner 222.

Additionally or alternatively, at block 608, the attribute vector selector 420 may cluster selected attribute vectors associated with artists and attendees attending an event into two or more discrete or overlapping clusters. For example, the attribute vector selector 420 may cluster the first media attribute vectors 311 associated with an artist into a first cluster and a second cluster. In this example, the first cluster and the second cluster are stored in the second attribute vector datastore 430. For example, at block 608 the attribute vector selector 420 may cluster the second media attribute vectors 312 associated with an attendee into a third cluster and a fourth cluster. In this example, the third and fourth clusters are stored in the second attribute vector datastore 430. In other examples, the attribute vector selector 420 may cluster the first media attribute vectors 311 into any number of clusters (e.g., three clusters, five clusters, one hundred clusters, etc.). In other examples, the attribute vector selector 420 may cluster the second media attribute vectors 312 into any number of clusters (e.g., three clusters, five clusters, one hundred clusters, etc.).

In some examples, the attribute vector combiner 222 aggregates the media attribute vectors associated with an artist (e.g., first media attribute vectors 311) to create an artist attribute vector (e.g., artist attribute vector 320). (Block 612). In some examples, an example process of aggregating attribute vectors, such as that of block 612, is demonstrated in the process 700 of FIG. 7. In some examples, the artist attribute vector (e.g., artist attribute vector 320) produced by the process 700 is provided as the attribute vector 410 by the attribute vector provider 440 to the first attribute vector datastore 224 of the server 220. In some examples, this enables the artist attribute vector (e.g., artist attribute vector 320) produced at block 612 to be the input attribute vector 405 to the attribute vector combiner 222 at a later stage. In some examples, at block 612, the aggregation process is repeated until all the artist attribute vectors associated with an event (e.g., artist attribute vectors 321) are created. Additionally or alternatively, in the event that the first media attribute vectors 311 have been clustered into two or more discrete or overlapping clusters by the attribute vector selector 420, each cluster may be aggregated independently to form respective artist attribute vectors 320 associated with each cluster. In some examples, clusters (e.g., subsets) of and/or ones of the first media attribute vectors 311 that deviate significantly from the remainder of clusters and/or ones of first media attribute vectors 311 may be dropped from (e.g., not included in) the aggregation.

In some examples, the attribute vector combiner 222 aggregates the media attribute vectors associated with an attendee (e.g., second media attribute vectors 312) to create an attendee attribute vector (e.g., attendee attribute vector 330). (Block 616). In some examples, an example process of aggregating attribute vectors, such as that of block 616, is demonstrated in the process 700 of FIG. 7. In some examples, the attendee attribute vector (e.g., attendee attribute vector 330) produced by the process 700 is provided as the attribute vector 410 by the attribute vector provider 440 to the first attribute vector datastore 224 of the server 220. In some examples, this enables the attendee attribute vector (e.g., attendee attribute vector 330) produced at this block to be the input attribute vector 405 to the attribute vector combiner 222 at a later stage. In some examples, at block 616, the aggregation process is repeated until all the attendee attribute vectors associated with an event (e.g., attendee attribute vectors 331) are created. In the event that the second media attribute vectors 312 have been clustered into two or more discrete or overlapping clusters by the attribute vector selector 420, each cluster may be aggregated independently to form respective attendee attribute vectors 331 associated with each cluster. In some examples, clusters (e.g., subsets) of and/or ones of the second media attribute vectors 312 that deviate significantly from the remainder of clusters and/or ones of the second media attribute vectors 312 may be dropped from (e.g., not included in) the aggregation.

In some examples, the attribute vector combiner 222 aggregates the artist attribute vectors associated with (e.g., for artists performing at) an event (e.g., artist attribute vectors 321) and the attendee attribute vectors associated with (e.g., for attendees attending) an event (e.g., attendee attribute vectors 331) to create an event attribute vector (e.g., event attribute vector 340). (Block 620). In some examples, an example process of aggregating attribute vectors, such as that of block 620, is demonstrated in process 700 of FIG. 7. In some examples, the event attribute vector (e.g., event attribute vector 340) produced by the process 700 is provided as the attribute vector 410 by the attribute vector provider 440 to the first attribute vector datastore 224 of the server 220. This enables the event attribute vector (e.g., event attribute vector 340) produced at this block to be the input attribute vector 405 to the attribute vector combiner 222 at a later stage. In the event that the artist attribute vectors 321 and the attendee attribute vectors 331 have been clustered into two or more discrete or overlapping clusters by the attribute vector selector 420, each cluster may be aggregated independently to form respective event attribute vectors 340 associated with each cluster. In some examples, clusters (e.g., subsets) of and/or ones of the artist attribute vectors 321 and the attendee attribute vectors 331 that deviate significantly from the remainder of clusters and/or ones of artist attribute vectors 321 and the attendee attribute vectors 331 may be dropped from (e.g., not included in) the aggregation.

In the example of FIG. 6, the attribute vector selector 420 determines whether a venue attribute vector is desired. (Block 624). If no venue attribute vector is desired (e.g., block 624 returns a result of NO), the process ends. If a venue attribute vector is desired (e.g., block 624 returns a result of YES), the process proceeds to block 628. Here, the first input handler 415 determines if the desired event attribute vectors (e.g., event attribute vectors 341) are available (e.g., in the first attribute vector datastore 224) to create the venue attribute vector 350. (Block 628). If the desired event attribute vectors have not all been calculated (e.g., block 628 returns a result of NO), the process repeats from block 604. If the desired event attribute vectors have been calculated (e.g., block 628 returns a result of YES), the process proceeds to block 632.

In some examples, the attribute vector combiner 222 aggregates the event attribute vectors associated with a venue (e.g., event attribute vectors 341) to create a venue attribute vector (e.g., venue attribute vector 350). (Block 632). In some examples, an example process of aggregating attribute vectors, such as that of block 632, is demonstrated in the process 700 of FIG. 7. In some examples, the venue attribute vector (e.g., venue attribute vector 350) produced by the process 700 is provided as the attribute vector 410 by the attribute vector provider 440 to the first attribute vector datastore 224 of the server 220. In some examples, this enables the venue attribute vector (e.g., venue attribute vector 350) produced at this block to be the input attribute vector 405 to the attribute vector combiner 222 at a later stage. In the event that the second event attribute vectors 341 have been clustered into two or more discrete or overlapping clusters by the attribute vector selector 420, each cluster is aggregated independently to form respective venue attribute vectors 241 associated with each cluster. In some examples, clusters (e.g., subsets) of and/or ones of the event attribute vectors 341 that deviate significantly from the remainder of clusters and/or ones of the event attribute vectors 341 may be dropped from (e.g., not included in) the aggregation. In some examples, after block 632, the process 600 ends.

FIG. 7 is a flowchart representative of machine readable instructions which may be executed to implement the attribute vector combiner 222 of FIG. 4 to aggregate attribute vectors. The process 700 of FIG. 7 is utilized at blocks 612, 616, 620, and 632 of the process 600 of FIG. 6 to aggregate attribute vectors to form a resultant vector.

In some examples, the process 700 begins with the attribute vector selector 420 selecting attribute vectors to be included in the aggregation. (Block 704). In some examples, these attribute vectors have been processed as input attribute vectors 405 by the first input handler 415 and are stored locally in the second attribute vector datastore 430. In some examples, the first input handler 415 is directed by the attribute vector selector 420 to import (e.g., from the second attribute vector datastore 224 of the server 220) attribute vectors that were created as a result of previous iterations of the process 600 and/or the process 700 (e.g., previously created aggregated attribute vectors). In some examples, the attribute vector selector 420 selects the first media attribute vectors 311, second media attribute vectors 312, artist attribute vectors 321, attendee attribute vectors 331, and/or event attribute vectors 341 of FIG. 3 to be aggregated.

In the event that the process 700 is performing block 612 of the process 600 of FIG. 6, the attribute vector selector 420 will first select media attribute vectors associated with a first artist performing at the event. In subsequent iterations of the process 700 within block 612, the attribute vector selector 420 will select a subsequent (e.g., second, third, fourth, etc.) set of media attribute vectors associates with subsequent (e.g., second, third, fourth, etc.) artists performing at the event.

In the event that the process 700 is performing block 616 of the process 600 of FIG. 6, the attribute vector selector 420 will select media attribute vectors associated with a first attendee attending an event. In subsequent iterations of the process 700 within block 616, the attribute vector selector 420 will select a subsequent (e.g., second, third, fourth, etc.) set of media attribute vectors associated with subsequent (e.g., second, third, fourth, etc.) attendees attending the event.

In the event the process 700 is performing block 620 of the of the process 600 of FIG. 6, the attribute vector selector 420 will select artist and/or attribute vectors that have been generated in previous iterations of the process 700 and are associated with a desired event. In the event the process 700 is performing block 632 of the process 600 of FIG. 6, the attribute vector selector 420 will select event attribute vectors that have been generated in previous iterations of the process 700 and are associated with a desired venue. In some examples, the attribute vector selector 420 selects an array of different types of attribute vectors (e.g., media, event, venue) associated with a user device (e.g., user device 200) performing a query.

The attribute vector weight applicator 435 determines if it is desired to add weights (e.g., scalar multiples) to the selected attribute vectors. (Block 708). In some examples, this decision is preprogrammed into the attribute vector combiner 222. In some examples, this decision is made via a user interface via a prompt and response. In some examples, any other means, mechanism, or process is applied to determine if weights are a desired component of the process 700. If weights (e.g., scalar multiples) are not desired (e.g., block 708 returns a result of NO), the process proceeds to block 712. If weights (e.g., scalar multiples) are desired (e.g., block 708 returns a result of YES), the process proceeds to block 716.

In the event weighting of the attribute vectors selected by the attribute vector selector 420 is not desired (e.g., block 708 returns a result of NO), the process proceeds to block 712. In some examples, the attribute vector aggregator 425 takes the unweighted average of the selected attribute vectors according to Equation 1. (Block 712). In these examples, the selected attribute vectors are each a $v_{Attribute}$ in the summation process, where n is the number of vectors selected. The result of this calculation is an unweighted average of the attribute vectors: $v_{aggregated}$. In some examples, the aggregated attribute vector $v_{aggregated}$ is stored locally in the second attribute vector datastore 430 and/or the first attribute vector datastore 224, and the process 700 proceeds to block 724.

In the event weighting of the attribute vectors selected by the attribute vector selector 420 is desired, the process 700 proceeds to block 716. In some examples, the attribute vector weight applicator 435 assigns weights (e.g., scalar multiples W in Equation 2) to ones of attribute vectors selected by the attribute vector selector 420. (Block 716). For example, artists may be weighted heavier than attendees when calculating an event attribute vector (e.g., event attribute vector 340). In some examples, these weights are associated with the attribute vectors selected by the attribute vector selector 420 and are indexed according to the conventions of Equation 2. In some examples, once the weights are assigned, the process 700 proceeds to block 720.

In some examples, the weighted average of the attribute vectors selected by the attribute vector selector 420 is taken according to Equation 2. (Block 720). In some examples, the weights assigned by attribute vector weight applicator to selected attribute vectors are represented by W in Equation 2 for each attribute vector i of the total number of attribute vectors selected n. In these examples, the selected attribute vectors are each a $v_{Attribute}$ at i index in the summation process, where n is the number of attribute vectors selected. The result of this calculation is a weighted average of the attribute vectors: $v_{Aggregated}$. In some examples, the aggregated attribute vector $v_{Aggregated}$ is stored locally in the second attribute vector datastore 430, and the process 700 proceeds to block 724.

In some examples, the aggregated attribute vector $v_{Aggregated}$ from Equation 1 or Equation 2 (e.g., query, attendee, artist, event, or venue attribute vector 410) is provided by the attribute vector provider 440 to the first attribute vector datastore 224. (Block 724). In some examples, the output aggregated attribute vector later serves as an input attribute vector (e.g., one of the media, attendee, artist, event, or venue attribute vectors 405) to the attribute vector combiner 222. In some examples, the process 700 proceeds to block 728.

In some examples, the attribute vector selector 420 determines if the desired aggregated attribute vectors have been calculated for the next stage of aggregation. (Block 728). In some examples, the attribute vector selector 420 determines if all the artist attribute vectors 321 have been calculated that are associated with a desired event (e.g., block 612). In some examples, the attribute vector selector 420 determines if all of the attendee attribute vectors 331 have been calculated that are associated with a desired event (e.g., block 616). In some examples, where each of the desired aggregated attribute vectors for the particular instance (e.g., blocks 612 or 616) have not yet been calculated (e.g., block 728 returns a result of NO), the process 700 repeats from block 704. In some examples, the decision of whether weights are desired (e.g., block 708) is carried over automatically from the previous iteration. In some examples, all the desired aggregated attribute vectors for the particular instance (e.g., one of blocks 612, 616, 620, 632) have been calculated, the process 700 ends and the associated block of the process 600 of FIG. 6 is completed (e.g., one of blocks 612, 616, 620, 632).

Figure 8:
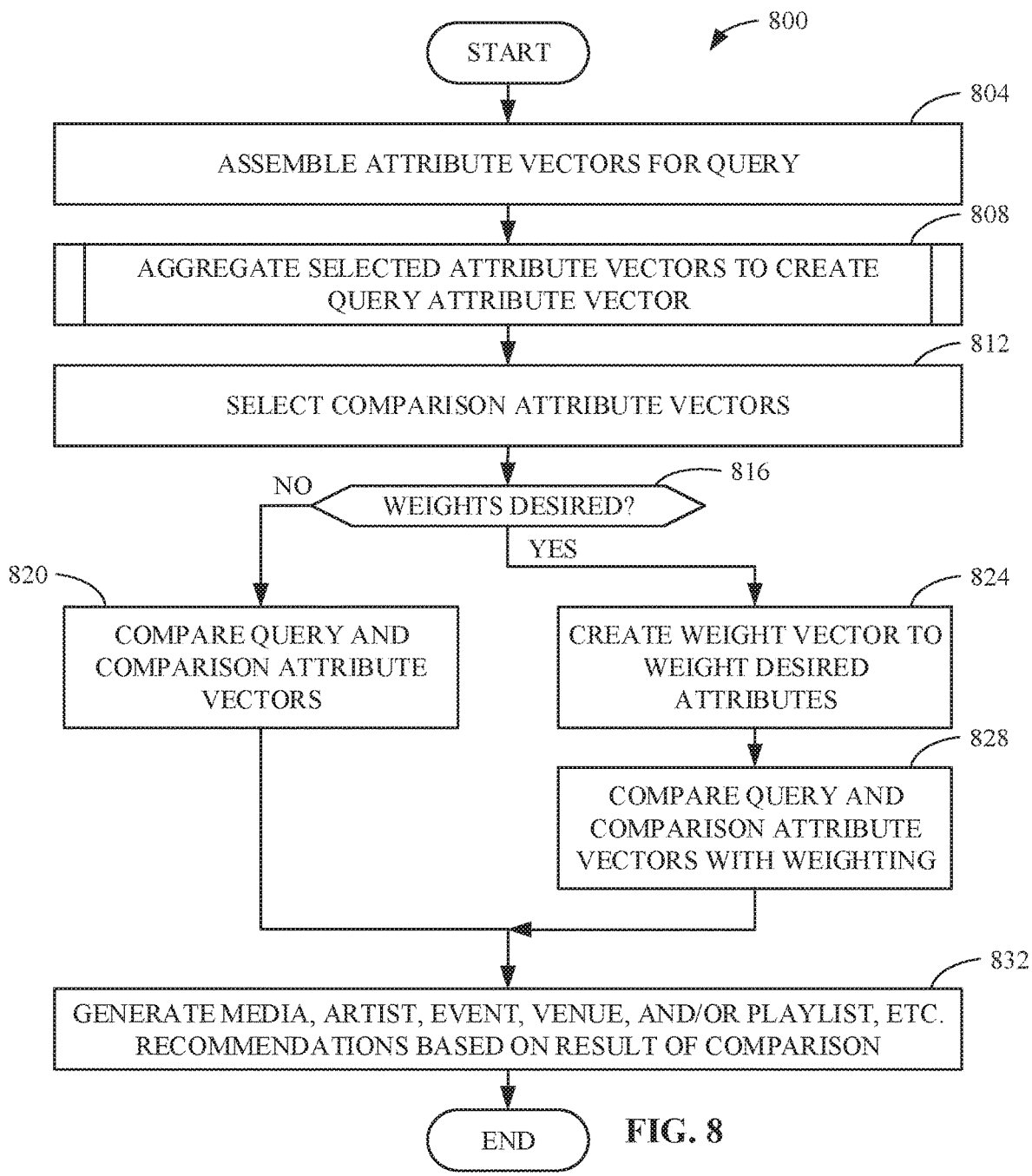
FIG. 8 is a flowchart representative of machine readable instructions which may be executed to implement the recommendation generator of FIG. 5 to generate recommendations.

FIG. 8 is a flowchart representative of machine readable instructions which may be executed to implement the recommendation generator 223 of FIG. 5 to generate recommendations (e.g., recommendations 510 of FIG. 5). In some examples, recommendations 510 are generated by the recommendation generator 223 based on the query attribute vector 505. In some examples, the process 800 begins with assembling attribute vectors for query. (Block 804).

In some examples, process 800 begins when the attribute vector selector 420 of the attribute vector combiner 222 directs the first input handler 415 of the attribute vector combiner 222 of FIG. 4 to import available media, artist, attendee, and/or venue attribute vectors (e.g., from the first attribute vector datastore 224) associated with the descriptive information regarding the media samples from media player 202 and/or other aspects of the user device 200. (Block 804). For example, the user device 200 transmits, via the first network interface 201 to the second network interface 221 of the server 220, descriptive information regarding the media samples included in (e.g., stored at, accessible to, etc.) the example media player 202. In some examples, the media player 202 or another example aspect of the user device 200 accesses descriptive information regarding events and/or venues attended by a user associated with the user device 200. For example, descriptive information concerning event attendance may be identified based on, for example, calendar information stored at and/or accessible to the user device 200, historic geographic location information of the user device 200, etc. In this example, the descriptive information regarding events and/or venues attended by the user associated with the user device 200 is transmitted to the server 220. The attribute vector selector 420 of the attribute vector combiner 222 may direct the first input handler 415 to import event and/or venue attribute vectors for events and/or venues attended by the user associated with the user device 200.

In some examples, the attribute vector combiner 222 aggregates (e.g., averages in a weighted or unweighted manner) the imported attribute vectors according to the process 700 to produce a query attribute vector (e.g., attribute vector 410). (Block 808). Subsequently, the query attribute vector is input into the recommendation generator 223 of FIG. 5 via the second input handler 515 as the query attribute vector 505 and is stored in the query attribute vector datastore 545.

In some examples, the query attribute vector 505 is assembled or selected in other manners. For example, the query attribute vector 505 could be a single media, artist, event, or venue attribute vector. For example, it may be desirable to generate venue recommendations from a single venue. For example, it may be desirable to generate artist recommendations from a venue, etc.

The comparison vector selector 520 selects a quantity of comparison attribute vectors from the comparison attribute vectors datastore 550 to be compared to the query attribute vector 505 sequentially and/or in parallel. (Block 812). In some examples, the comparison attribute vectors datastore 550 has access to some or all of the attribute vectors that have ever been created by components of the server 220. For example, the comparison attribute vectors datastore 550 may be substantially coincident with or in communication with the first attribute vector datastore 224. This allows the query attribute vector 505 to be compared to any and/or all attribute vectors ever created. In other examples, only a portion of attribute vectors created by manual rating and/or example process described herein are accessible to the recommendation generator 223. For example, process 800 may occur only after a significant quantity of attribute vectors (e.g., media, artist, event, and/or venue attribute vectors) have been generated and are assessable to the comparison vector selector 520. In some examples, the comparison vector selector 520 may select attribute vectors and/or associated clusters of vectors associated with an artist, event, and/or venue.

Next, the attribute weight applicator 525 determines if weighting is to be used in the comparison process. (Block 816). In some examples, the weighting used in process 800 (e.g., by the recommendation generator 223) is different from the weighting used in the example process 700 (e.g., by the attribute vector combiner 222) in that process 800 involves applying a vector of weights rather than a scalar weight (e.g., a scalar multiple). In some examples, the process 800 creates a vector of weights indexed according to the query and comparison attribute vectors in order to increase the importance of certain attributes during comparison. In some examples, this decision is preprogrammed into the recommendation generator 223. In some examples, the decision of block 816 is made via a user interface via a prompt and response. That is, a user may be allowed to select whether weighting is to be used. While an example approach to determining whether weighting is to be used, any other approach may additionally or alternatively be used to determine if weights are a desired component of process 800. If weights (e.g., a weight vector) are not desired (e.g., block 816 returns a result of NO), process 800 proceeds to block 820. If weights (e.g., a weight vector) are desired (e.g., block 816 returns a result of YES), the process proceeds to block 824.

In some examples, in the event the inclusion of weights (e.g., a weight vector) is not desired (e.g., block 816 returns a result of NO), the vector comparator 530 compares, simultaneously or in parallel, comparison attribute vectors selected by the comparison vector selector 520 with the query attribute vector 505 without weighting. (Block 820). In some examples, this comparison is done by taking the absolute value of the difference between the comparison and query attribute vectors. In some examples, this is illustrated by Equation 3 below.

$$\Delta = |v_{Query} - v_{comparison}| \qquad \text{Equation 3}$$

In the example of Equation 3, the variable delta ($\Delta$) represents the scalar result of the absolute value (e.g., the Euclidian norm, the Euclidian distance, etc.) of the difference of the query attribute vector and the comparison attribute vector. In the example of Equation 3, $v_{Query}$ is the variable representing the query attribute vector (e.g., query attribute vector 505). In the example of Equation 3, $v_{comparison}$ is the variable representing a comparison attribute vector selected by the comparison vector selector 520. In some examples, the delta ($\Delta$) value is calculated for a quantity of comparison attribute vectors ($v_{Comparison}$). In some examples, the operation of Equation 3 is completed using all available comparison vectors. In other examples, the operation of Equation 3 is completed for available comparison vectors until a quantity of results within a threshold is obtained.

In response to the attribute weight applicator 525 determining that weighting is desired, (e.g., block 816 returning a result of YES), the example attribute weight applicator 525 assigns weights to the various attributes. (Block 824). In some examples, the weights are disposed in a vector format to allow each weight to multiply the results of certain attributes, thereby penalizing differences in higher weighted attributes higher. The example vector comparator 530 compares the query attribute vector 505 to the comparison attribute vectors selected by the comparison vector selector 520. (Block 828). Equation 4 below describes an example approach to comparing a query and comparison attribute vector with weighting using the vector comparator 530.

$$\Delta = |w(v_{Query} - v_{Comparison})|  \qquad \text{Equation 4}$$

In the example of Equation 4, the variable definitions of Equation 3 are incorporated. The weight vector w represents a vector of weights to be applied to each corresponding attribute of the result of the difference between $v_{Query}$ and $v_{Comparison}$. The multiplication present in Equation 4 uses element-wise multiplication rather than ordinary matrix multiplication. For example, each index i of the vector w is multiplied by the corresponding index i of the vector resulting from $v_{Query}-v_{Comparison}$ and the product is placed in an index i of a resultant vector. In some examples, the operation of Equation 4 is completed using all available comparison vectors. In other examples, the operation of Equation 4 is completed for available comparison vectors until a quantity of results within a threshold is obtained.

In some examples, the recommendation compiler 535 produces recommendations based on a threshold of similarity (e.g., a threshold delta (Δ) value in Equations 3 and 4) and stores the recommendations in the recommendation datastore 540. In other examples, rather than rely on a threshold delta (Δ) value for similarity, the recommendation compiler selects the lowest delta (Δ) values found by the vector comparator 530. In some examples, media samples associated with an artist or media attribute vector are sorted into a playlist by the playlist generator 555. Additionally or alternatively, media samples associated with clusters of attribute vectors associated with one or more artists are sorted into respective playlists by the playlist generator 555. In some examples, media, artist, event, venue, and/or playlist recommendations are generated by the recommendation compiler 535. (Block 832). In some examples, any other comparison technique is used to select comparison attribute vectors based on a query attribute vector. The recommendation provider 560 presents the recommendations 510 (e.g., compiled playlists, event and/or venue recommendations, etc.) to the user device 200 via communication between the second network interface 221 of the server 220 and the first network interface 201 of the user device 200. In some examples, playlists generated by the playlist generator 555 are sent to the media player 202 of the user device 200. The process 800 ends after presenting these recommendations.

Figure 9:
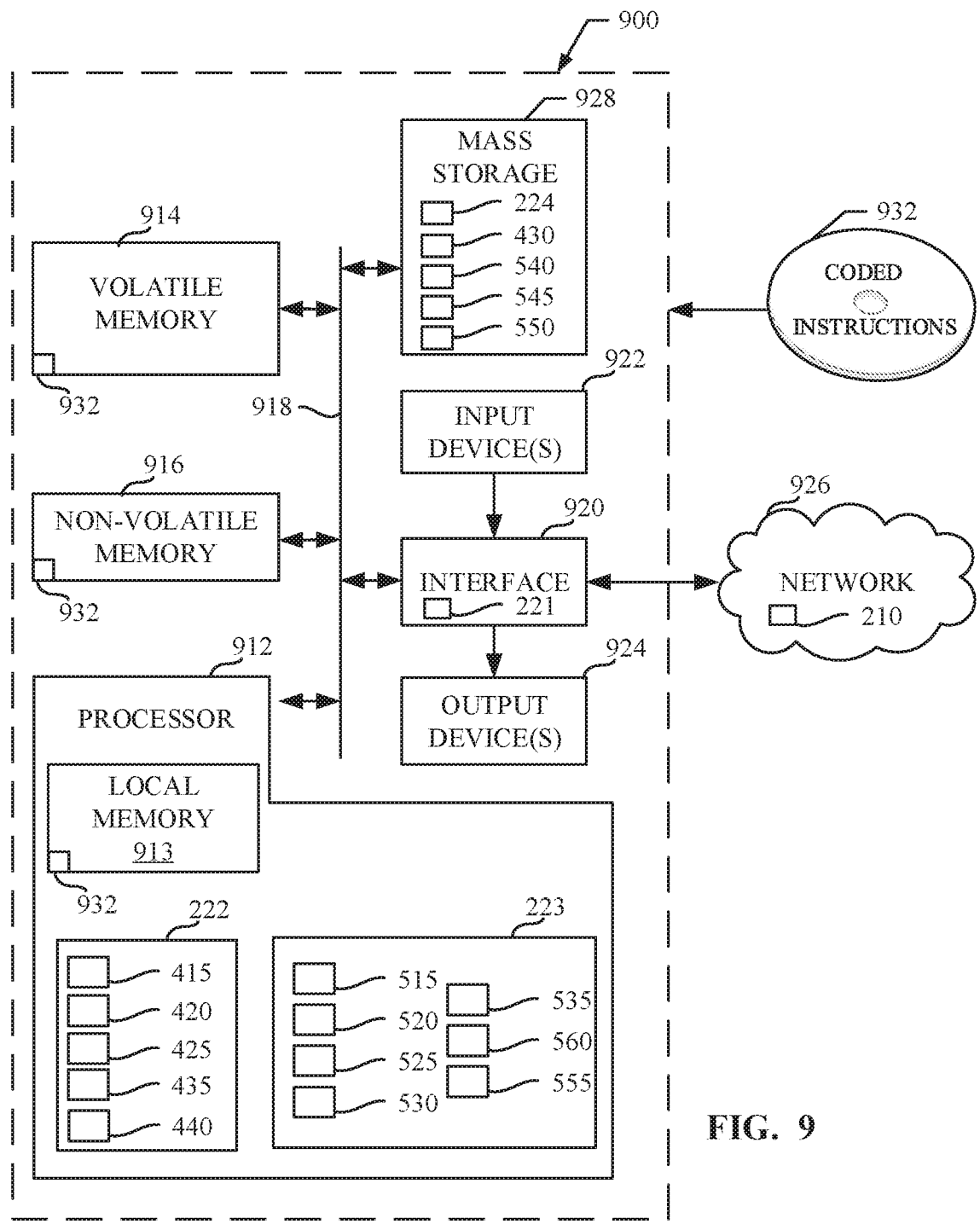
FIG. 9 is a block diagram of an example processing platform structured to execute the instructions of FIGS. 6, 7, and/or 8 to implement the attribute vector combiner and recommendation generator of FIGS. 4 and/or 5.

FIG. 9 is a block diagram of an example processor platform 900 structured to execute the instructions of FIGS. 6, 7, and/or 8 to implement the apparatus of FIGS. 4 and/or 5, and/or the server 220 of FIG. 2. The processor platform 900 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the first input handler 415, the example attribute vector selector 420, the example attribute vector aggregator 425, the example attribute vector weight applicator 435, the example attribute vector provider 440 and/or, more generally, the example attribute vector combiner 222 of FIG. 4, and/or the example second input handler 515, the example comparison vector selector 520, the example attribute weight applicator 525, the example vector comparator 530, the example recommendation compiler 535, the example playlist generator 555, the example recommendation provider 560 and/or, more generally, the example recommendation generator 223 of FIG. 5.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 6, 7, and/or 8 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed that improve the ability to generate recommendations for media, artists, events, venues, and/or playlists based on preferences of a user relating to media, artists, events, venues, and/or playlists. The disclosed methods, apparatus and articles of manufacture improve the efficiency of using a computing device by enabling a content-based recommendation that synthesizes attribute vectors for various entities in a logical and simple manner. The disclosed methods, apparatus and articles of manufacture are accordingly directed to one or more improvement(s) in the functioning of a computer. Further examples and combinations thereof include the following:

Example 1 includes an apparatus to generate a recommendation, the apparatus comprising an attribute vector aggregator to form a resultant attribute vector based on an input set of attribute vectors, the set of attribute vectors containing at least one of a media attribute vector, an attendee attribute vector, an artist attribute vector, an event attribute vector, or a venue attribute vector, and a recommendation generator, the recommendation generator including a vector comparator to perform a comparison between an input attribute vector and other attribute vectors, and a recommendation compiler to create one or more recommendations of at least one of media, an artist, an event, or a venue based on the comparison.

Example 2 includes the apparatus of example 1, wherein an attribute vector is a numerical vector having dimensional indices, the numerical vector correlated with a corresponding set of attributes describing the numerical vector according to the dimensional indices of the set of attributes.

Example 3 includes the apparatus of example 1, wherein the attribute vector aggregator is to form the resultant attribute vector by averaging the input set of attribute vectors with or without weighting.

Example 4 includes the apparatus of example 1, wherein the vector comparator is to perform a comparison between the input attribute vector and the other attribute vectors by taking a mathematical difference between the input attribute vector and the other attribute vectors.

Example 5 includes the apparatus of example 1, wherein the input attribute vector of the recommendation generator is a query attribute vector.

Example 6 includes the apparatus of example 1, wherein one or more of the recommendations created by the recommendation compiler is a recommendation of an event.

Example 7 includes the apparatus of example 1, wherein the attribute vector aggregator is to generate one or more artist attribute vectors, each artist attribute vector based on first media attribute vectors, generate one or more attendee attribute vectors, each attendee attribute vector based on second media attribute vectors, generate one or more event attribute vectors, each event attribute vector based on the one or more artist attribute vectors and the one or more attendee attribute vectors, and generate a venue attribute vector based on the one or more event attribute vectors.

Example 8 includes the apparatus of example 1, further including a recommendation provider to provide one or more recommendations to a user device.

Example 9 includes at least one non-transitory computer readable medium comprising instructions that, when executed, cause at least one processor to at least generate at least one artist attribute vector based on at least one of first media attribute vectors, generate at least one attendee attribute vector based on at least one of second media attribute vectors, generate at least one event attribute vector based on the at least one attendee attribute vector and the at least one artist attribute vector, and generate a venue attribute vector based on the at least one event attribute vector.

Example 10 includes the at least one non-transitory computer readable medium of example 9, wherein, the instructions, when executed, cause at least one processor to generate a query attribute vector based on third attribute vectors, compare the query attribute vector to fourth attribute vectors to create a comparison, the fourth attribute vectors different from the third attribute vectors, generate one or more recommendations based on the comparison, and provide the one or more recommendations to a user device.

Example 11 includes the at least one non-transitory computer readable medium of example 10, wherein the instructions, when executed, cause at least one processor to generate a playlist of media samples based on the one or more recommendations.

Example 12 includes the at least one non-transitory computer readable medium of example 10, wherein the one or more recommendations include at least one of a media sample, an artist, an event, or a venue.

Example 13 includes the at least one non-transitory computer readable medium of example 9, wherein the venue attribute vector is generated based on the at least one event attribute vector by taking a weighted or unweighted average.

Example 14 includes the at least one non-transitory computer readable medium of example 9, wherein the instructions, when executed, cause at least one processor to generate a query attribute vector based on a third set of attribute vectors, compare the query attribute vector to attribute vectors to create a comparison, and generate a recommendation based on the comparison.

Example 15 includes a method of generating a recommendation, the method comprising calculating, by executing instruction with a processor, at least one artist attribute vector based on at least one of first media attribute vectors, calculating, by executing instruction with a processor, at least one attendee attribute vector based on at least one of second media attribute vectors, calculating, by executing instruction with a processor, at least one event attribute vector based on the at least one attendee attribute vector and the at least one artist attribute vector, and calculating, by executing instruction with a processor, a venue attribute vector based on the at least one event attribute vector.

Example 16 includes the method of example 15, further including calculating, by executing instruction with a processor, a query attribute vector based on third attribute vectors, comparing, by executing instruction with a processor, the query attribute vector to fourth attribute vectors to create a comparison, the fourth attribute vectors different from the third attribute vectors, generating, by executing instruction with a processor, one or more recommendations based on the comparison, and providing, by executing instruction with a processor, the one or more recommendations to a user device.

Example 17 includes the method of example 16, wherein each attribute vector is a numerical vector including dimensional indices, wherein the comparison includes taking the absolute value of the mathematical difference between the query attribute vector and each of the fourth attribute vectors with or without weighting.

Example 18 includes the method of example 16, wherein the query attribute vector is an artist attribute vector, further including generating a recommendation of an artist based on the comparison.

Example 19 includes the method of example 15, wherein generating, by executing instructions a processor, a venue attribute vector based on the at least one event attribute vector is done by taking a weighted or unweighted average.

Example 20 includes the method of example 15, further including generating, by executing instruction with a processor, a query attribute vector based on a third set of attribute vectors, comparing, by executing instruction with a processor, the query attribute vector to attribute vectors to create a comparison, and generating, by executing instruction with a processor, a recommendation based on the comparison.

Example 21 includes an apparatus for generating a recommendation comprising means for aggregating to form a resultant attribute vector based on an input set of attribute vectors, the set of attribute vectors containing at least one of a media attribute vector, an attendee attribute vector, an artist attribute vector, an event attribute vector, or a venue attribute vector means for comparing to perform a comparison between an input attribute vector and other attribute vectors, and means of compiling a recommendation to compile one or more recommendations of at least one of media, an artist, an event, or a venue based on the comparison.

Example 22 includes the apparatus of example 21, wherein an attribute vector is a numerical vector having dimensional indices, the numerical vector correlated with a corresponding set of attributes describing the numerical vector according to the dimensional indices of the set of attributes.

Example 23 includes the apparatus of example 21, wherein the means for aggregating is to form the resultant attribute vector by averaging the input set of attribute vectors with or without weighting.

Example 24 includes the apparatus of example 21, wherein the means for comparing is to perform a comparison between the input attribute vector and the other attribute vectors by taking a mathematical difference between the input attribute vector and the other attribute vectors.

Example 25 includes the apparatus of example 21, wherein the input attribute vector is a query attribute vector.

Example 26 includes the apparatus of example 21, wherein one or more of the recommendations created by the means for compiling is a recommendation of an event.

Example 27 includes the apparatus of example 21, wherein the means for aggregating is to generate one or more artist attribute vectors, each artist attribute vector based on first media attribute vectors, generate one or more attendee attribute vectors, each attendee attribute vector based on second media attribute vectors, generate one or more event attribute vectors, each event attribute vector based on the one or more artist attribute vectors and the one or more attendee attribute vectors, and generate a venue attribute vector based on the one or more event attribute vectors.

Example 28 includes the apparatus of example 21, further including means for providing to provide one or more recommendations to a user device.

The following claims are hereby incorporated into this Detailed Description by this reference, with each claim standing on its own as a separate embodiment of the present disclosure.

What is claimed is:

1. An apparatus to generate one or more recommendations, the apparatus comprising:
   an attribute vector selector to determine an artist that that is to perform at an event hosted at a venue and a first person that is to attend the event;
   an attribute vector aggregator to form an event attribute vector associated with the event based on a weighted average of an attendee attribute vector associated with the first person and an artist attribute vector associated with the artist, the artist attribute vector weighted more heavily than the attendee attribute vector; and
   a recommendation generator including:
      a vector comparator to perform a comparison between a query attribute vector and the event attribute vector, the query attribute vector associated with a media player of a device associated with a second person; and
      a recommendation compiler to:
         create a recommendation of at least one of the artist or the event for the second person based on the comparison, wherein creating the recommendation based on the comparison comprises creating the recommendation based on a finding that the query attribute vector is threshold similar to the event attribute vector; and
         cause the media player to access a playlist of one or more media samples based on the recommendation, at least one of the attribute vector selector, the attribute vector aggregator, the vector comparator, or the recommendation compiler implemented by processor circuitry.

2. The apparatus of claim 1, wherein at least one of the event attribute vector, the attendee attribute vector, the artist attribute vector, or the query attribute vector includes a numerical vector, the numerical vector correlated with a set of attributes describing the numerical vector according to corresponding indices of the set of attributes.

3. The apparatus of claim 1, wherein the attribute vector aggregator is to determine the weighted average of the attendee attribute vector and the artist attribute vector.

4. The apparatus of claim 1, wherein the vector comparator is to determine a mathematical difference between the query attribute vector and the event attribute vector to perform the comparison between the query attribute vector and the event attribute vector.

5. The apparatus of claim 1, wherein the event attribute vector is a first event attribute vector, the attendee attribute vector is a first attendee attribute vector, the artist attribute vector is a first artist attribute vector, and the query attribute vector to the recommendation generator includes at least one of a media attribute vector associated with the media player, a second event attribute vector associated with the media player, a second attendee vector associated with the media player, or a second artist attribute vector associated with the media player.

6. The apparatus of claim 1, wherein the recommendation includes the venue at which the event is hosted.

7. The apparatus of claim 1, wherein the attribute vector aggregator is to:
   generate the artist attribute vector based on a first media attribute vector associated with a recent set list of the artist and a second media attribute vector associated with an older set list of the artist, the first media attribute vector weighted more heavily than the second media attribute vector;
   generate the attendee attribute vector based on a third media attribute vector associated with the first person and a fourth media attribute vector associated with the first person; and
   generate a venue attribute vector based on the event attribute vector.

8. The apparatus of claim 1, further including a recommendation provider to provide the recommendation to the device.

9. At least one non-transitory computer readable medium comprising instructions that, when executed, cause at least one processor to at least:
generate an artist attribute vector associated with an artist that is to perform at an event hosted at a venue, the artist attribute vector based on a first media attribute vector associated with a recent set list of the artist and a second media attribute vector associated with an older set list of the artist, the first media attribute vector weighted more heavily than the second media attribute vector;
generate an attendee attribute vector associated with a person that is to attend the event, the attendee attribute vector based on a third media attribute vector associated with the person and a fourth media attribute vector associated with the person;
generate an event attribute vector based on the attendee attribute vector and the artist attribute vector;
generate a venue attribute vector based on the event attribute vector;
generate a query attribute vector based on at least a fifth media attribute vector;
perform a comparison between the query attribute vector and a comparison attribute vector selected from the group consisting of the artist attribute vector, the event attribute vector, and the venue attribute vector;
create a recommendation of at least one of the artist, the event, or the venue based on the comparison, wherein creating the recommendation based on the comparison comprises creating the recommendation based on a finding that the query attribute vector is threshold similar to the comparison attribute vector; and
cause a media player of a device to access a playlist of media samples based on the recommendation.

10. The at least one non-transitory computer readable medium of claim 9, wherein the person is a first person,
wherein the device is associated with a second person,
wherein the fifth media attribute vector is associated with a media player of the device associated with the second person, and
wherein causing the media player of the device to access the playlist of media samples based on the recommendation comprises providing the playlist of media samples to the device.

11. The at least one non-transitory computer readable medium of claim 10, wherein the instructions, when executed, cause the at least one processor to generate the playlist of media samples based on the recommendation.

12. The at least one non-transitory computer readable medium of claim 10, wherein the recommendation includes at least one of a media sample of the playlist of media samples, the artist, the event, or the venue.

13. The at least one non-transitory computer readable medium of claim 9, wherein the event attribute vector is a first event attribute vector, the event is a first event, and the instructions, when executed, cause the at least one processor to:
generate a second event attribute vector associated with a second event hosted at the venue; and
determine an average of the first event attribute vector and the second event attribute vector to generate the venue attribute vector.

14. A method of generating one or more recommendations, the method comprising:
calculating, by executing one or more instructions with a processor, an artist attribute vector associated with an artist that is to perform at an event hosted at a venue, the artist attribute vector based on a first media attribute vector associated with a recent set list of the artist and a second media attribute vector associated with an older set list of the artist, the first media attribute vector weighted more heavily than the second media attribute vector;
calculating, by executing one or more instructions with the processor, an attendee attribute vector associated with a person that is to attend the event, the attendee attribute vector based on a third media attribute vector associated with the person and a fourth media attribute vector associated with the person;
calculating, by executing one or more instructions with the processor, an event attribute vector based on the attendee attribute vector and the artist attribute vector;
calculating, by executing one or more instructions with the processor, a venue attribute vector based on the event attribute vector;
generating, by executing one or more instructions with the processor, a query attribute vector based on at least a fifth media attribute vector;
performing, by executing one or more instructions with the processor, a comparison between the query attribute vector and a comparison attribute vector selected from the group consisting of the artist attribute vector, the event attribute vector, and the venue attribute vector;
creating, by executing one or more instructions with the processor, a recommendation of at least one of the artist, the event, or the venue based on the comparison, wherein creating the recommendation based on the comparison comprises creating the recommendation based on a finding that the query attribute vector is threshold similar to the comparison attribute vector; and
causing a media player of a device to access a playlist of media samples based on the recommendation.

15. The method of claim 14, wherein the person is a first person,
wherein the device is associated with a second person,
wherein the fifth media attribute vector is associated with a media player of the device associated with the second person, and
wherein causing the media player of the device to access the playlist of media samples based on the recommendation comprises providing the playlist of media samples to the device.

16. The method of claim 15, wherein at least one of the query attribute vector, the fifth media attribute vector, the artist attribute vector, the event attribute vector, or the venue attribute vector includes a numerical vector including dimensional indices, and wherein performing the comparison between the query attribute vector and the comparison attribute vector comprises determining an absolute value of a mathematical difference between the query attribute vector and the comparison attribute vector.

17. The method of claim 15, wherein the artist attribute vector is a first artist attribute vector, the query attribute vector includes a second artist attribute vector associated with a second artist, and the method further includes generating a recommendation of the second artist based on the comparison.

18. The method of claim 14, wherein the event attribute vector is a first event attribute vector, and the method further includes:

generating, by executing one or more instruction with the processor, a second event attribute vector associated with a second event hosted at the venue; and generating, by executing one or more instructions with the processor, the venue attribute vector based on an average of the first event attribute vector and the second event attribute vector.

\* \* \* \* \*